United States Patent
Morein

(10) Patent No.: US 10,573,214 B2
(45) Date of Patent: Feb. 25, 2020

(54) HIERARCHICAL GATE LINE DRIVER

(71) Applicant: Synaptics Incorporated, San Jose, CA (US)

(72) Inventor: Stephen L. Morein, San Jose, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 14 days.

(21) Appl. No.: 15/996,385

(22) Filed: Jun. 1, 2018

(65) Prior Publication Data

US 2019/0088184 A1   Mar. 21, 2019

Related U.S. Application Data

(60) Provisional application No. 62/559,459, filed on Sep. 15, 2017.

(51) Int. Cl.
| | | |
|---|---|---|
| G09G 3/20 | (2006.01) | |
| G06F 3/044 | (2006.01) | |
| G06F 3/041 | (2006.01) | |
| G06K 9/00 | (2006.01) | |

(52) U.S. Cl.
CPC ............ G09G 3/20 (2013.01); G06F 3/044 (2013.01); G06F 3/0412 (2013.01); G06F 3/0416 (2013.01); G06K 9/0004 (2013.01); G09G 2310/0286 (2013.01); G09G 2310/06 (2013.01); G09G 2310/08 (2013.01); G09G 2360/14 (2013.01)

(58) Field of Classification Search
CPC ...... G06F 3/0412; G06F 3/0416; G06F 3/044; G06K 9/0004; G09G 3/20; G09G 2310/0286; G09G 2310/06; G09G 2310/08; G09G 2360/14
See application file for complete search history.

(56) References Cited

U.S. PATENT DOCUMENTS

| | | |
|---|---|---|
| 2015/0269897 A1 | 9/2015 | Kitsomboonloha et al. |
| 2016/0180817 A1 | 6/2016 | Cho et al. |
| 2017/0178581 A1 | 6/2017 | Li et al. |
| 2017/0193891 A1* | 7/2017 | Park ............... G09G 3/2092 |

FOREIGN PATENT DOCUMENTS

| | | |
|---|---|---|
| KR | 20160045215 A | 4/2016 |
| KR | 20160069024 A | 6/2016 |

OTHER PUBLICATIONS

International Search Report and Written Opinion from PCT Application No. PCT/US2018/045126, dated Dec. 14, 2018 (160411WO01).

* cited by examiner

*Primary Examiner* — Nelson M Rosario

(74) *Attorney, Agent, or Firm* — Paradice & Li LLP

(57) ABSTRACT

A hierarchical gate driver circuit for an array of pixel elements. The hierarchical gate driver circuit includes a shift register and two or more groups of gate lines drivers. The shift register is configured to activate a plurality of select lines based at least in part on a periodic clock signal. A first group of gate line drivers is configured to drive a plurality of first gate lines, each coupled to a respective row of first pixel elements in the array, when a first select line of the plurality of select lines is activated. A second group of gate line drivers is configured to drive a plurality of second gate lines, each coupled to a respective row of second pixel elements in the array, when a second select line of the plurality of select lines is activated.

41 Claims, 9 Drawing Sheets

HIERARCHICAL GATE LINE DRIVER

CROSS-REFERENCE TO RELATED APPLICATION

This application claims priority and benefit under 35 USC § 119(e) to U.S. Provisional Patent Application No. 62/559,459, filed on Sep. 15, 2017, which is incorporated herein by reference in its entirety.

TECHNICAL FIELD

The present embodiments relate generally to display devices, and specifically to a hierarchical gate line driver for an array of pixel elements.

BACKGROUND OF RELATED ART

A display panel (e.g., a liquid crystal display (LCD) panel) is typically formed from an array of pixel elements (e.g., liquid crystal capacitors) arranged in rows and columns. Each row of pixel elements is coupled to a respective gate line, and each column of pixel elements is coupled to a respective source line. More specifically, each pixel element in the array is coupled to a particular gate line and source line via an "access" transistor (e.g., an n-channel metal oxide semiconductor (NMOS) transistor). For example, the gate of the transistor may be coupled to the gate line and the drain (or source) of the transistor may be coupled to the source line. Thus, the pixel element may be accessed by driving a relatively high voltage ($V_{GH}$) on the gate line, which effectively turns on the access transistor. With the access transistor turned on, the liquid crystal capacitor can be updated with new pixel data by driving a voltage on the corresponding source line (e.g., the voltage level may depend on the desired color and/or intensity of the pixel value).

Each row of pixel elements is coupled to a gate driver and each column of pixel elements is coupled to a source driver. The source driver is configured to drive pixel data, via the source lines, onto the pixel elements of the array. The gate driver is configured to select a particular row of pixel elements to receive the pixel data, for example, by driving the gate line coupled to the selected row. A display panel is typically updated by successively "scanning" the rows of pixel elements (e.g., one row at a time), until each row of pixel elements has been updated. For example, the gate driver may include a shift register configured to drive each of the gate lines, in succession, based on a periodic clock signal.

In conventional gate driver implementations, the output from each stage of the shift register controls the activation (or deactivation) of a particular gate line in the array. Because each gate line is driven by a different shift register stage, the footprint of a display panel may increase significantly based on the number of pixels (or rows of pixels) in the array. Furthermore, the speed at which the shift register is able to "scan" through the array may be limited by the time required to drive each row of pixel elements with a sufficiently high gate voltage ($V_{GH}$). Thus, it may be desirable to reduce the footprint of the gate driver circuitry while also increasing the speed (and flexibility) with which scans may be performed.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A hierarchical gate driver circuit for an array of pixel elements is disclosed. The gate driver circuit includes a shift register, a first group of gate line drivers, and a second group of gate line drivers. The gate driver circuit is configured to activate a plurality of select lines based at least in part on a periodic clock signal. The first group of gate line drivers is configured to drive a plurality of first gate lines when a first select line of the plurality of select lines is activated. Each of the first gate lines is coupled to a respective row of first pixel elements in the array. The second group of gate line drivers is configured to drive a plurality of second gate lines when a second select line of the plurality of select lines is activated. Each of the second gate lines is coupled to a respective row of second pixel elements in the array.

The shift register may comprise at least a first stage and a second stage. The first stage is configured to selectively activate the first select line based at least in part on a first phase offset of the clock signal. The second stage is configured to selectively activate the second select line based at least in part on a second phase offset of the clock signal. More specifically, the second stage may be configured to activate the second select line after the first select line has been activated. In some aspects, the activation of the first select line may overlap, in part, with the activation of the second select line.

The first group of gate line drivers may comprise a first plurality of driver elements each coupled to a respective one of the first gate lines. The second group of gate line drivers may comprise a second plurality of driver elements each coupled to a respective one of the second gate lines. In some aspects, each of the driver elements is configured to bootstrap a voltage driven onto a respective gate line. For example, at least one of the driver elements may comprise a boosted n-channel metal oxide semiconductor (NMOS) driver or a boosted p-channel metal oxide semiconductor (PMOS) driver. In other aspects, at least one of the driver elements may comprise a complementary metal oxide semiconductor (CMOS) inverter.

The first group of gate line drivers may be configured to drive each of the first gate lines in succession. Similarly, the second group of gate line drivers may be configured to drive each of the second gate lines in succession. In some aspects, the plurality of first gate lines and the plurality of second gate lines are driven at different times.

The gate driver circuit may further comprise a gate line controller configured to selectively suppress one or more gate line drivers of the first group when the first select line is activated, and to selectively suppress one or more gate line drivers of the second group when the second select line is activated. For example, each pixel element in the array may comprise at least one of a display pixel, a photodiode, a capacitive sensor, or a combination thereof.

In some aspects, the gate line controller may be configured to selectively suppress at least one of the first or second groups of gate line drivers based at least in part on a presence of an input object in a region coinciding with the array of pixel elements. For example, the gate line controller may be configured to suppress the second group of gate line drivers when the input object is detected in a region coinciding with the first pixel elements in the array. Furthermore, the gate line controller may be configured to suppress the first group of gate line drivers when the input object is detected in a region coinciding with the first pixel elements in the array.

The array of pixel elements may coincide with a sensing region provided by a plurality of sensor electrodes. Thus, in some aspects, the gate line controller may be configured to suppress at least one of the first or second groups of gate line drivers when the sensor electrodes are driven for capacitive sensing. Moreover, the shift register may continue to activate the plurality of select lines, in succession, when the sensor electrodes are driven for capacitive sensing.

In some implementations, the rows of first pixel elements may include one or more rows of display pixels and one or more rows of photodiodes. Thus, the first group of gate line drivers may comprise one or more display drivers each coupled to a respective row of the display pixels, and one or more sensor drivers each coupled to a respective row of the photodiodes. In some aspects, the gate line controller may be configured to suppress the one or more sensor drivers when updating a display associated with the array of pixel elements. Furthermore, the gate line controller may be configured to suppress the one or more display drivers when sensing objects in a sensing region associated with the array of pixel elements.

In other implementations, the array of pixel elements may comprise display pixels of a foveated display. For example, the second pixel elements may coincide with a fixation point of a user of the foveated display. Thus, in some aspects, the first group of gate line drivers may be configured to drive two or more of the first gate lines, concurrently, when the first select line is activated. On the other hand, the second group of gate line drivers may be configured to drive each of the second gate lines, successively, when the second select line is activated.

BRIEF DESCRIPTION OF THE DRAWINGS

The present embodiments are illustrated by way of example and are not intended to be limited by the figures of the accompanying drawings.

DETAILED DESCRIPTION

Figure 1:
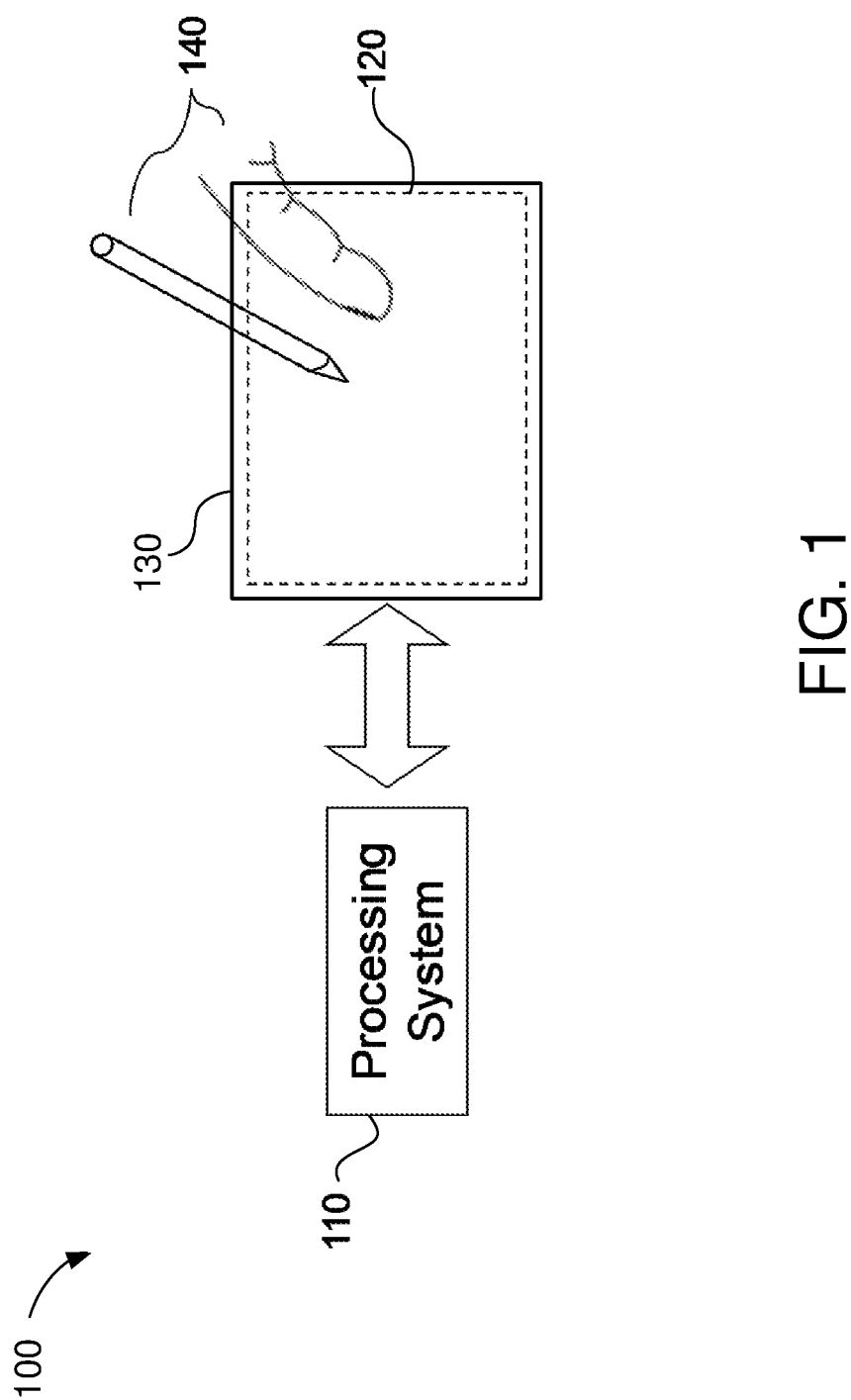
FIG. 1 shows an example display device within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general purpose processor, conventional processor, controller, microcontroller, and/or state machine capable of executing scripts or instructions of one or more software programs stored in memory.

FIG. 1 shows an example display device 100 within which the present embodiments may be implemented. The display device 100 includes a processing system 110 and a display 130. The display device 100 may be configured to provide a visual interface for an electronic system (not shown for simplicity). Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the display device 100 may be implemented as a physical part of the corresponding electronic system. Alternatively, the display device 100 may be physically separated from the electronic system. The display device 100 may be coupled to (and communicate with) components of the electronic system using various wired and/or wireless interconnection and communication technologies, such as buses and networks. Examples technologies may include Inter-Integrated Circuit (I²C), Serial Peripheral Interface (SPI), PS/2, Universal Serial bus (USB), Bluetooth®, Infrared Data Association (IrDA), and various radio frequency (RF) communication protocols defined by the IEEE 802.11 standard.

The display 130 may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. For example, the display 130 may include an array of pixel elements (e.g., liquid crystal capacitors) coupled to a gate driver and a source driver (not shown for simplicity). Each row of pixel elements may be coupled to the gate driver via a respective gate line. Each column of pixel elements may be coupled to the source driver via a respective source line (or data line). The source driver may be configured to drive pixel data, via the source lines, onto the pixel elements of the array. The gate driver may be configured to select a particular row of pixel elements to receive the pixel data, for example, by driving the gate line coupled to the selected row. In some aspects, the display 130 may be updated by successively "scanning" the rows of pixel elements (e.g., one row at a time), until each row of pixel elements has been updated.

In some embodiments, the display device 100 may correspond to a position sensor device (e.g., also referred to as a "touchpad," "touch sensor device," or "proximity sensor device") configured to sense input provided by one or more input objects 140 in a sensing region 120 associated with the display 130. Example input objects 140 include fingers, styli, and the like. The sensing region 120 may encompass any space above, around, in, and/or proximate to the display 130 in which the display device 100 is able to detect user input (such as provided by one or more input objects 140). In some embodiments, the sensing region 120 may overlap at least part of an active area of the display 130. For example, the display device 100 may comprise a touch screen interface for the associated electronic system.

The size, shape, and/or location of the sensing region 120 may vary depending on actual implementations. In some embodiments, the sensing region 120 may extend from a surface of the display device 100 in one or more directions in space, for example, until a signal-to-noise ratio (SNR) of the sensors falls below a threshold suitable for object detection. In some embodiments, the sensing region 120 may detect inputs involving no physical contact with any surface of the display device 100, contact with an input surface (e.g., a touch surface and/or screen) of the display device 100, contact with an input surface of the display device 100 coupled with some amount of applied force or pressure, and/or any combination thereof.

In some embodiments, input surfaces may be provided by, and/or projected on, one or more surfaces of a housing of the display device 100 (e.g., as an image). For example, the sensing region 120 may have a rectangular shape when projected onto an input surface of the display device 100. In some aspects, inputs may be provided through images spanning one, two, three, or higher dimensional spaces in the sensing region 120. In some other aspects, inputs may be provided through projections along particular axes or planes in the sensing region 120. Still further, in some aspects, inputs may be provided through a combination of images and projections in the sensing region 120.

The display device may utilize various sensing technologies to detect user input. Example sensing technologies may include capacitive, elastic, resistive, inductive, magnetic, acoustic, ultrasonic, and optical sensing technologies. In some embodiments, the display device 100 may utilize capacitive sensing technologies to detect user inputs. For example, the sensing region 120 may include one or more capacitive sensing elements (e.g., sensor electrodes) to create an electric field. The display device 100 may detect inputs based on changes in capacitance of the sensor electrodes. In some other embodiments, the display device 100 may utilize optical sensing technologies to detect user inputs and/or identify features of an input object (e.g., a fingerprint). For example, the sensing region 120 may include one or more optical sensors (e.g., photodiodes, CMOS image sensor arrays, CCD arrays, and/or any other sensors capable of detecting wavelengths of light in the visible, infrared, and/or the ultraviolet spectrum) configured to detect objects through imaging or detecting changes in optical patters in the sensing region 120.

In some embodiments, the processing system 110 may be implemented as a set of modules that are implemented in firmware, software, or a combination thereof. Example modules include hardware operation modules for operating hardware such as sensor electrodes and display screens; data processing modules for processing data such as sensor signals and positional information; and reporting modules for reporting information. In some embodiments, the processing system 110 may include sensor operation modules configured to operate sensing elements to detect user input in the sensing region 120; identification modules configured to identify gestures such as mode changing gestures; and mode changing modules for changing operation modes of the display device 100 and/or electronic system.

The processing system 110 may respond to user input in the sensing region 120 by triggering one or more actions. Example actions include changing an operation mode of the display device 100 and/or graphical user interface (GUI) actions such as cursor movement, selection, menu navigation, and the like. In some embodiments, the processing system 110 may provide information about the detected input to the electronic system (e.g., to a central processing unit (CPU)). The electronic system may then process information received from the processing system 110 to carry out additional actions (e.g., changing a mode of the electronic system and/or GUI actions).

The processing system 110 may be configured to execute instructions related to sensing inputs via the sensing region 120 and updating the display 130. In some embodiments, the display 130 may share physical elements with sensor components of the sensing region 120. For example, one or more sensor electrodes may be used in displaying a visual interface and sensing inputs. More specifically, a display electrode used for displaying at least a portion of the visual interface may also operate as a sensor electrode used for sensing inputs. For example, the processing system 110 may drive a display electrode to update at least a portion of the display 130 and sense user inputs, concurrently. In another example, the processing system 110 may drive a first display electrode to update at least a portion of the display 130 while concurrently driving a second display electrode to sense user inputs.

As described above, the display 130 may be updated by successively scanning the rows of pixel elements (e.g., row-by-row). For example, the gate driver may include a shift register configured to drive each of the gate lines (e.g., coupled to the rows of pixel elements), in succession, based on a periodic clock signal. Since the same set of source lines are shared by each row of pixel elements in the array, the gate driver may ensure that no two gate lines are driven or activated at the same time (e.g., to prevent data intended for one row of pixel elements from being driven onto another row of pixel elements). Thus, in existing gate driver implementations, each gate line is driven by a different shift register stage.

Aspects of the present disclosure recognize that using a different shift register stage to drive each row of pixel elements may cause the footprint of the display 130 to increase significantly based on the number of pixels (or rows of pixels) in the array. Furthermore, the time required to drive each row of pixel elements with a sufficiently high gate voltage (e.g., $\geq V_{GH}$) may limit the speed at which the shift register is able to scan through the array. Thus, in some embodiments, the display 130 may include hierarchical gate driver circuitry to scan the array of pixel elements in a hierarchical manner. For example, each shift register stage in the "hierarchy" may control multiple gate lines in the array. As a result, the number of shift register stages needed to drive the same number of gate lines is reduced (e.g., compared to existing gate driver implementations). Among other advantages, the embodiments herein allow the footprint of the gate driver (and display 130) to be significantly reduced. Furthermore, the hierarchical manner in which scanning is performed may allow for faster scanning speeds as well as greater flexibility in how the scans are performed.

Figure 2:
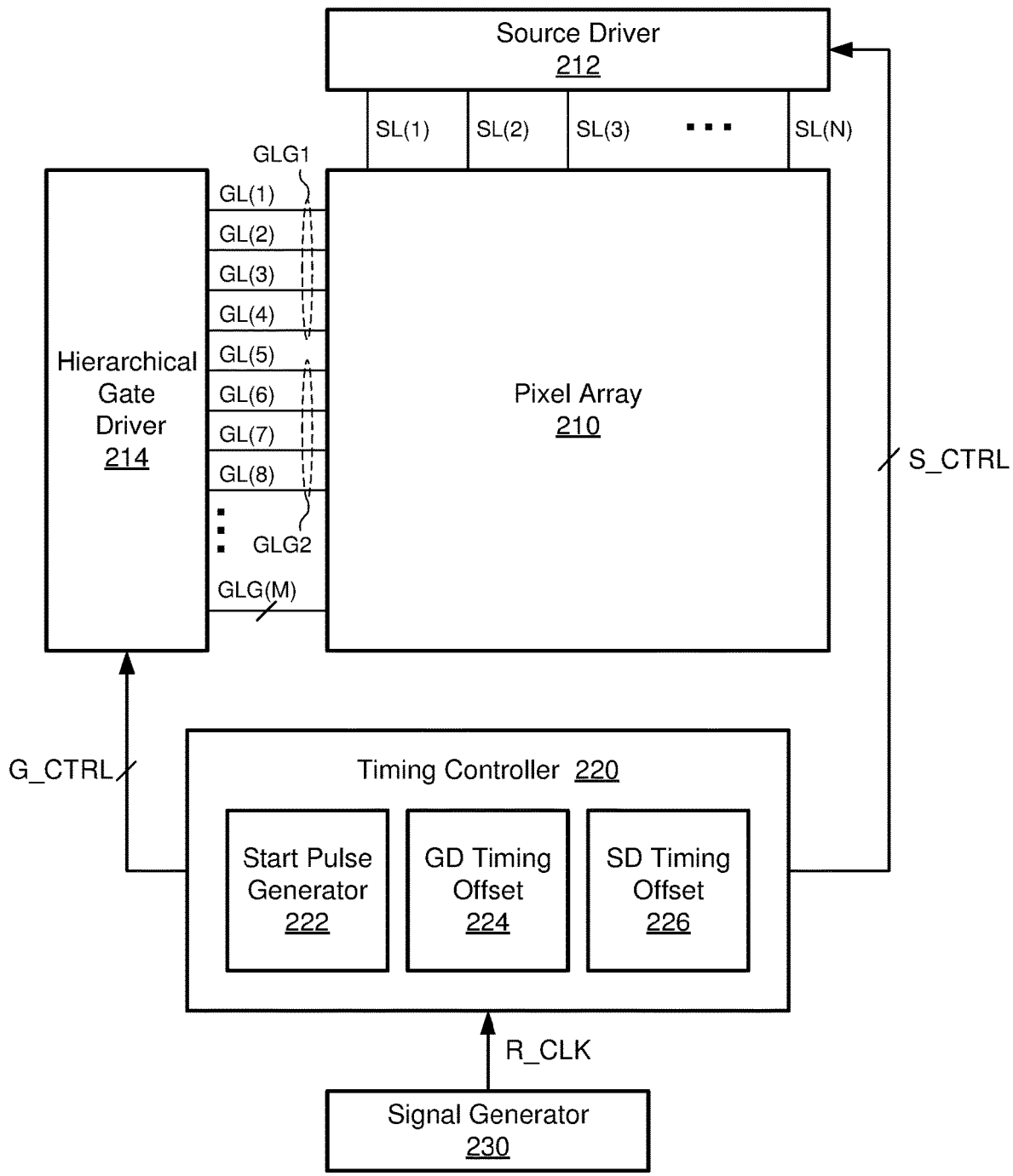
FIG. 2 is a block diagram of a display device having hierarchical gate driver circuitry, in accordance with some embodiments.

FIG. 2 is a block diagram of a display device 200 having hierarchical gate driver circuitry, in accordance with some embodiments. The display device 200 includes a pixel array 210, a source driver 212, a hierarchical gate driver 214, and a timing controller 220. The pixel array 210 may comprise a plurality of pixel elements (not shown for simplicity) arranged in rows and columns. Each row of pixel elements is coupled to a respective gate line (GL), and each column of pixel elements is coupled to a respective source line (SL). Accordingly, each pixel element in the array 210 is positioned at an intersection of a gate line and a source line. The pixel elements in the array 210 may include display pixels (e.g., liquid crystal capacitors), photodiodes (e.g., for image sensing), sensor electrodes (e.g., for capacitive sensing), or any combination thereof.

The source driver 212 is coupled to the pixel array 210 via the source lines SL(1)-SL(N). In some aspects, the source driver 212 may be configured to drive pixel data (e.g., in the form of a corresponding voltage) onto the source lines SL(1)-SL(N) to update a visual interface displayed by the pixel array 210. For example, the voltage driven onto the source lines SL(1)-SL(N) may affect the charge stored on each of the pixel elements in the array 210 (e.g., where the pixel elements are liquid crystal capacitors). The charge stored on each pixel element may directly affect the color and/or intensity of light emitted by that pixel element. It is noted that, each row of pixel elements in the pixel array 210 is coupled to the same source lines SL(1)-SL(N). Thus, in some aspects, the display device 200 may update the pixel array 210 by successively scanning the rows of pixel elements.

The hierarchical gate driver 214 is coupled to the pixel array 214 via the gate lines GL(1)-GL(M). In some aspects, the hierarchical gate driver 214 may be configured to select which row of pixel elements is to receive the pixel data driven by the source driver 212 at any given time. For example, each pixel element in the array 210 may be coupled to one of the source lines SL(1)-SL(N) and one of the gate lines GL(1)-GL(M) via an access transistor (not shown for simplicity). The access transistor may be an NMOS (or PMOS) transistor having a gate terminal coupled to one of the gate lines GL(1)-GL(N), a drain (or source) terminal coupled to one of the source lines SL(1)-SL(M), and a source (or drain) terminal coupled to a corresponding pixel element. When one of the gate lines GL(1)-GL(M) is driven with a sufficiently high voltage (e.g., $\geq V_{GH}$), the access transistors coupled to the selected gate line turn on and allow current to flow from the source lines SL(1)-SL(N) to the corresponding row of pixel elements. Accordingly, the hierarchical gate driver 214 may be configured to drive (or "activate") each of the gate lines GL(1)-GL(M), in succession, until each row of the pixel array 210 has been updated.

The timing controller 220 is configured to control a timing of the source driver 212 and hierarchical gate driver 214. For example, the timing controller 220 may generate a first set of timing control (S_CTRL) signals to control activation of the source lines SL(1)-SL(N) by the source driver 212. The timing controller 220 may also generate a second set of timing control (G_CTRL) signals to control activation of the gate lines GL(1)-GL(M) by the hierarchical gate driver 214. The timing controller 220 may generate the S_CTRL and G_CTRL signals based on a reference clock (R_CLK) signal generated by a signal generator 230. For example, the signal generator 230 may be a crystal oscillator. In some embodiments, the timing controller 220 may include a start pulse generator 222, a source driver (SD) offset timer 224, and a gate driver (GD) offset timer 226.

The start pulse generator 222 may generate a "start" pulse (e.g., included in the set of G_CTRL signals and/or S_CTRL signals) based on a timing of the R_CLK signal. For example, the start pulse may signal the start of a scanning operation to update the pixel array 210. In some aspects, the start pulse may trigger a cascade of gate line activations through the pixel array 210. More specifically, the start pulse may, in part, cause the hierarchical gate driver 214 to drive at least the first gate line in the cascade (e.g., GL(1)). The start pulse may also cause the source driver 212 to drive the source lines SL(1)-SL(N) with pixel data intended for the pixel elements coupled to the first gate line in the cascade.

The SD offset timer 224 may generate one or more source clock signals (e.g., included in the set of S_CTRL signals) based on respective phase offsets of the R_CLK signal. The source clock signals may be used to drive the source lines SL(1)-SL(N). In some aspects, each transition of the source clock signals may cause the source driver 212 to drive the source lines SL(1)-SL(N) with pixel data intended for a particular row of pixel elements in the pixel array 210. For example, once a start pulse has been asserted, the source driver 222 may periodically drive the source lines SL(1)-SL(N) with pixel data until each row of the pixel array 210 has been updated. The source clock signals may control the timing (or periodicity) for which the source lines SL(1)-SL (N) are "refreshed" (e.g., driven with updated pixel data).

The GD offset timer 226 may generate a plurality of gate clock signals (e.g., included in the set of G_CTRL signals) based on respective phase offsets of the R_CLK signal. The gate clock signals may be used to drive the gate lines GL(1)-GL(M). In some aspects, the timing of the gate clock signals may be synchronized with the timing of the source clock signals. For example, the synchronization between the gate clock signals and the source clock signals may ensure that the hierarchical gate driver 214 activates the correct gate line (e.g., coupled to the row of pixel elements to be driven with pixel data) at the time the source driver 212 drives the source lines SL(1)-SL(N) with the pixel data intended for that row of pixel elements.

In some embodiments, each transition of the gate clock signals may cause the hierarchical gate driver 214 to select a plurality of the gate lines GL(1)-GL(M) for activation. In some aspects, multiple adjacent gate lines may be assigned to a particular gate line group. For example, gate lines GL(1)-GL(4) may be assigned to a first gate line group (GLG1) and gate lines GL(5)-GL(8) may be assigned to a second gate line group (GLG2). Thus, when the hierarchical gate driver 214 detects a start pulse and a concurrent transition of any of the gate clock signals (e.g., while the start pulse is asserted), the hierarchical gate driver 214 may select the first gate line group GLG1. In some aspects, the hierarchical gate driver 214 may successively drive each of the gate lines GL(1)-GL(4) when the first gate line group GLG1 is selected. In other aspects, the hierarchical gate driver 214 may suppress one or more of the gate lines GL(1)-GL(4) when the first gate line group GLG1 is selected (e.g., as described in greater detail below with respect to FIG. 7).

When the hierarchical gate driver 214 detects a subsequent transition of any of the gate clock signals, the hierarchical gate driver 214 may select the second gate line group GLG2. In some aspects, the hierarchical gate driver 214 may successively drive each of the gate lines GL(5)-GL(8) when the second gate line group GLG2 is selected. In other aspects, the hierarchical gate driver 214 may refrain from driving one or more of the gate lines GL(5)-GL(8) even when the second gate line group GLG2 is selected. The hierarchical gate driver 214 may continue to select different gate line groups, in response to subsequent transitions of the gate clock signals, until each gate line group in the pixel array 210 has been selected.

As described above, the hierarchical gate driver 214 may be configured to drive the gate lines GL(1)-GL(M) in a hierarchical manner. For example, rather than directly driving a particular gate line in response to each transition of the gate clock signals, the hierarchical gate driver 214 instead selects a group of gate lines for activation in response to each transition of the gate clock signals. The hierarchical gate driver 214 may then selectively activate individual gate lines within the selected group. The hierarchical manner in which the gate lines GL(1)-GL(M) are driven allows the hierarchical gate driver 214 to have a smaller footprint than that of existing gate driver circuitry (e.g., since fewer shift register stages are needed to drive an equivalent number of gate lines). Furthermore, the hierarchy of control may enable the hierarchical gate driver 214 to scan the pixel array 210 faster, and with greater flexibility, than existing gate driver circuitry (e.g., as described in greater detail below).

Figure 3:
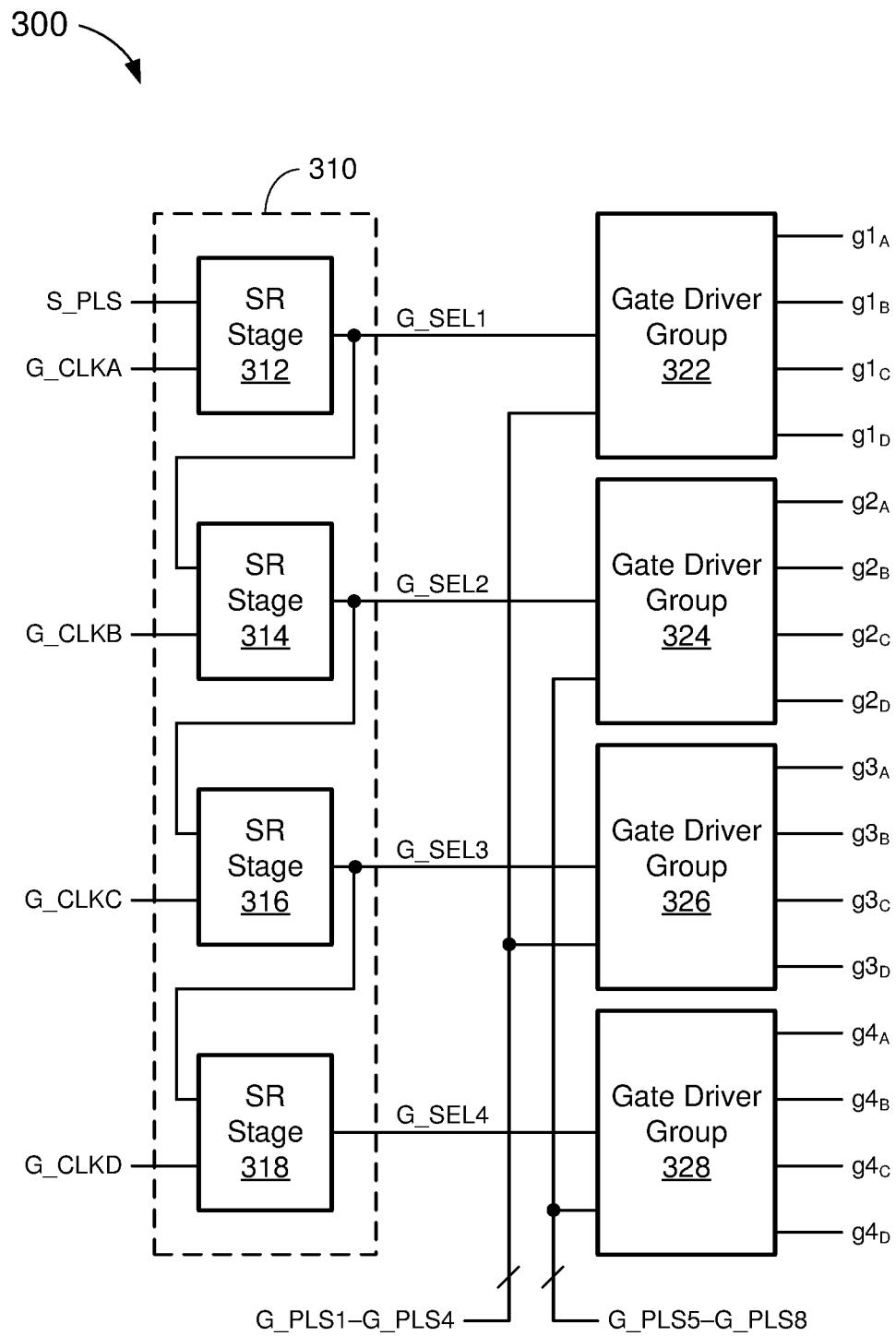
FIG. 3 is a block diagram of a hierarchical gate driver circuit, in accordance with some embodiments.

FIG. 3 is a block diagram of a hierarchical gate driver circuit 300, in accordance with some embodiments. For example, the hierarchical gate driver circuit 300 may be an embodiment of the hierarchical gate driver 214 shown in FIG. 2. The hierarchical gate driver circuit 300 includes a shift register 310 and a plurality of gate driver groups 322-328. For simplicity, only four gate driver groups 322-328 are depicted in the example of FIG. 3. However, in actual implementations, the hierarchical gate driver circuit 300 may include fewer or more gate driver groups than what is depicted in FIG. 3.

The shift register 310 may comprise multiple stages 312-318. For example, the shift register (SR) stages 312-318 may be implemented as a cascade of flip-flops arranged in a serial-in/parallel-out (SIPO) configuration. In some embodiments, the number of SR stages in the shift register 310 may correspond with the number of gate driver groups in the hierarchical gate driver circuit 300. Thus, although only four SR stages 312-318 are depicted in the example of FIG. 3, actual implementations of the shift register 310 may include fewer or more stages than what is depicted in FIG. 3. The shift register 310 is coupled to receive a start pulse (S_PLS) and a plurality of gate clock signals (G_CLKA-G_CLKD). As described above, the start pulse S_PLS may be used to trigger a scan of a pixel array (not shown for simplicity) coupled to a plurality of gate lines ($g1_A$-$g4_D$). The gate clock signals G_CLKA-GLCKD may be used to control activation of the gate lines $g1_A$-$g4_D$ at different times. Thus, the gate clock signals G_CLKA-G_CLKD may each have a different phase offset relative to one another.

The first SR stage 312 in the cascade is configured to receive S_PLS as its input, and is configured to drive a first group select line (G_SEL1) based on S_PLS and a first gate clock signal (G_CLKA). The input of the second SR stage 314 is coupled to the output of the first SR stage 312. Thus, the second SR stage 314 is configured to drive a second group select line (G_SEL2) based on G_SEL1 and a second gate clock signal (G_CLKB). The input of the third SR stage 316 is coupled to the output of the second SR stage 314. Thus, the third SR stage 316 is configured to drive a third group select line (G_SEL3) based on G_SEL2 and a third gate clock signal (G_CLKC). The input of the fourth SR stage 318 is coupled to the output of the third SR stage 316. Thus, the fourth SR stage 318 is configured to drive a fourth group select line (G_SEL4) based on G_SEL3 and a fourth gate clock signal (G_CLKD). In some embodiments, the output of the fourth SR stage 318 may be coupled to the input of a fifth SR stage in the cascade (not shown for simplicity).

The gate driver groups 322-328 are coupled to the outputs of the SR stages 312-318 via the group select lines G_SEL1-G_SEL4, respectively. Each of the gate driver groups 322-328 is configured to selectively drive a group of gate lines (g1-g4) when a corresponding group select line is activated. More specifically, the group select lines G_SEL1-G_SEL4 may enable the respective gate driver groups 322-328 to drive a corresponding group of gate lines. For example, activation of the first group select line G_SEL1 enables the first gate driver group 322 to drive a first group of gate lines $g1_A$-$g1_D$. Activation of the second group select line G_SEL2 enables the second gate driver group 324 to drive a second group of gate lines $g2_A$-$g2_D$. Activation of the third group select line G_SEL3 enables the third gate driver group 326 to drive a third group of gate lines $g3_A$-$g3_D$. Activation of the fourth group select line G_SEL4 enables the fourth gate driver group 328 to drive a fourth group of gate lines $g4_A$-$g4_D$.

In some embodiments, the gate driver groups 322-328 may drive the gate lines $g1_A$-$g4_D$ based at least in part on a series of gate pulses G_PLS1-G_PLS8. More specifically, the gate pulses G_PLS1-G_PLS8 may control a timing with which the gate driver groups 322-328 drives the gate lines $g1_A$-$g4_D$. For example, gate pulses G_PLS1-G_PLS4 may be provided to the first gate driver group 322 and the third gate driver group 326, whereas gate pulses G_PLS5-G_PLS8 may be provided to the second gate driver group 324 and the fourth gate driver group 328. Thus, the first gate driver group 322 may drive the first group of gate lines $g1_A$-$g1_D$ based on gate pulses G_PLS1-G_PLS4. The second gate driver group 324 may drive the second group of gate lines $g2_A$-$g2_D$ based on gate pulses G_PLS5-G_PLS8. The third gate driver group 326 may drive the third group of gate lines $g3_A$-$g3_D$ based on gate pulses G_PLS1-G_PLS4. The fourth gate driver group 328 may drive the fourth group of gate lines $g4_A$-$g4_D$ based on gate pulses G_PLS5-G_PLS8.

Figure 4A:
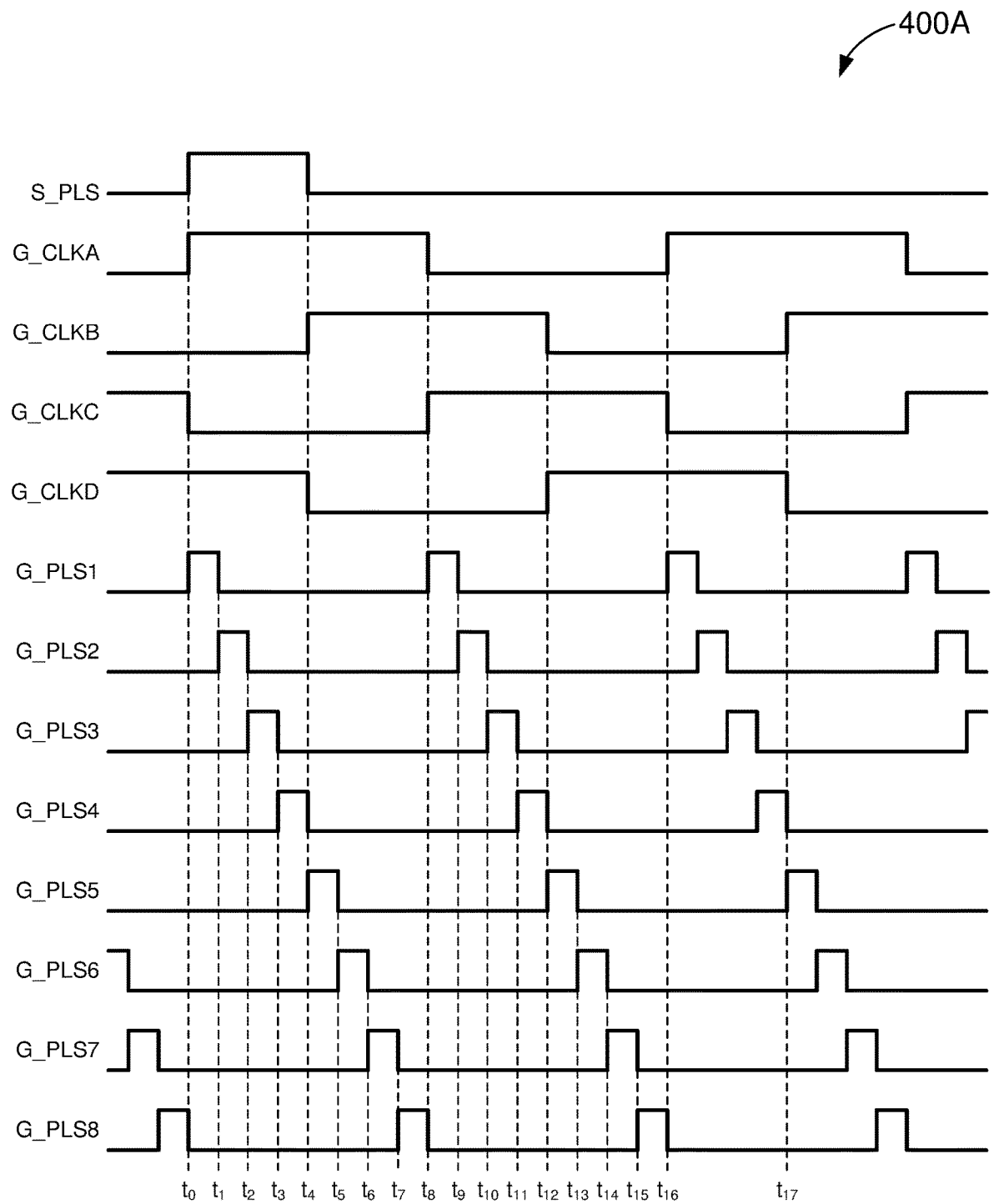
FIGS. 4A and 4B are timing diagrams depicting example timing signals that may be used to control operation of a hierarchical gate driver circuit.
Figure 4B:
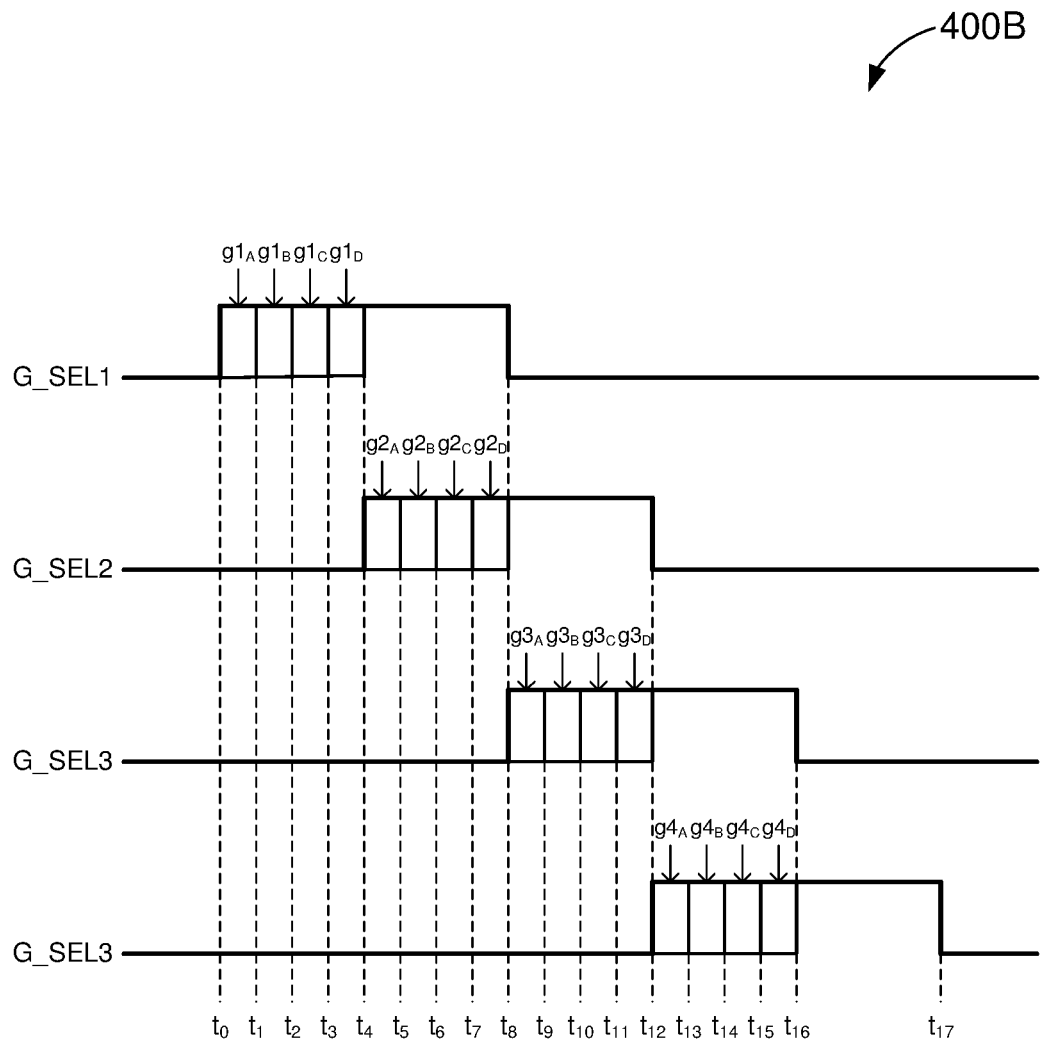

FIGS. 4A and 4B are timing diagrams depicting example timing signals that may be used to control operation of a hierarchical gate driver circuit. With reference for example to FIG. 3, the timing signals depicted in FIGS. 4A and 4B may control an operation of the hierarchical gate driver circuit 300.

At time $t_0$, the start pulse S_PLS is asserted and the first gate clock signal G_CLKA transitions to a logic high state. The rising-edge transition of G_CLKA causes the first SR stage 312 to shift-in (e.g., store) the current state of S_PLS. Since S_PLS is currently asserted to a logic high state, at time to, the first SR stage 312 also drives the first group select line G_SEL1 to a logic high state. The activation of G_SEL1 enables the first gate driver group 322 to drive the first group of gate lines $g1_A$-$g1_D$ in response to gate pulses G_PLS1-G_PLS4.

The first gate driver group 322 may drive gate line $g1_A$, at time $t_0$, for the duration in which G_SEL1 and G_PLS1 are concurrently asserted (e.g., from times $t_0$ to $t_1$). The first gate driver group 322 may drive gate line $g1_B$, at time $t_1$, for the duration in which G_SEL1 and G_PLS2 are concurrently asserted (e.g., from times $t_1$ to $t_2$). The first gate driver group 322 may drive gate line $g1_C$, at time $t_2$, for the duration in which G_SEL1 and G_PLS3 are concurrently asserted (e.g., from times $t_2$ to $t_3$). The first gate drive group may drive gate line $g1_D$, at time $t_3$, for the duration in which G_SEL1 and G_PLS4 are concurrently asserted (e.g., from times $t_3$ to $t_4$).

At time $t_4$, the start pulse S_PLS is deasserted and the second gate clock signal G_CLKB transitions to a logic high state. The rising-edge transition of G_CLKB causes the second SR stage 314 to shift-in the current state of G_SEL1. Since G_SEL1 is currently asserted to a logic high state, at time $t_4$, the second SR stage 314 also drives the second group select line G_SEL2 to a logic high state. The activation of G_SEL2 enables the second gate driver group 324 to drive the second group of gate lines $g2_A$-$g2_D$ in response to gate pulses G_PLS5-G_PLS8.

The second gate driver group 324 may drive gate line $g2_A$, at time $t_4$, for the duration in which G_SEL2 and G_PLS5 are concurrently asserted (e.g., from times $t_4$ to $t_5$). The second gate driver group 324 may drive gate line $g2_B$, at time $t_5$, for the duration in which G_SEL2 and G_PLS6 are concurrently asserted (e.g., from times $t_5$ to $t_6$). The second gate driver group may drive gate line $g2_C$, at time $t_6$, for the duration in which G_SEL2 and G_PLS7 are concurrently asserted (e.g., from times $t_6$ to $t_7$). The second gate driver group may drive gate line $g2_D$, at time $t_7$, for the duration in which G_SEL2 and G_PLS8 are concurrently asserted (e.g., from times $t_7$ to $t_8$).

At time $t_8$, the first gate clock signal G_CLKA transitions to a logic low state while the third gate clock signal G_CLKC transitions to a logic high state. The falling-edge transition of G_CLKA causes the first SR stage 312 to shift-in the current state of S_PLS. Since S_PLS is currently deasserted to a logic low state, at time $t_8$, the first SR stage 312 also pulls G_SEL1 to a logic low state. The deactivation of G_SEL1 disables the first gate driver group 322, thus preventing activation of any of the first group of gate lines $g1_A$-$g1_D$.

The rising-edge transition of G_CLKC causes the third SR stage 316 to shift-in the current state of G_SEL2. Since G_SEL2 is currently asserted to a logic high state, at time $t_8$, the third SR stage 316 also drives the third group select line G_SEL3 to a logic high state. The activation of G_SEL3 enables the third gate driver group 326 to drive the third group of gate lines $g3_A$-$g3_D$ in response to gate pulses G_PLS1-G_PLS4.

The third gate driver group 326 may drive gate line $g3_A$, at time $t_8$, for the duration in which G_SEL3 and G_PLS1 are concurrently asserted (e.g., from times $t_8$ to $t_9$). The third gate driver group 326 may drive gate line $g3_B$, at time $t_9$, for the duration in which G_SEL3 and G_PLS2 are concurrently asserted (e.g., from times $t_9$ to $t_{10}$). The third gate driver group 326 may drive gate line $g3_C$, at time $t_{10}$, for the duration in which G_SEL3 and G_PLS3 are concurrently asserted (e.g., from times $t_{10}$ to $t_{11}$). The third gate driver group 326 may drive gate line $g3_D$, at time $t_{11}$, for the duration in which G_SEL3 and G_PLS4 are concurrently asserted (e.g., from times $t_{11}$ to $t_{12}$).

At time $t_{12}$, the second gate clock signal G_CLKB transitions to a logic low state while the fourth gate clock signal G_CLKD transitions to a logic high state. The falling-edge transition of G_CLKB causes the second SR stage 314 to shift-in the current state of G_SEL1. Since G_SEL1 is currently deasserted to a logic low state, at time $t_{12}$, the second SR stage 314 also pulls G_SEL2 to a logic low state. The deactivation of G_SEL2 disables the second gate driver group 324, thus preventing activation of any of the second group of gate lines $g2_A$-$g2_D$.

The rising-edge transition of G_CLKD causes the fourth SR stage 318 to shift-in the current state of G_SEL3. Since G_SEL3 is currently asserted to a logic high state, at time $t_{12}$, the fourth SR stage 318 also drives the fourth group select line G_SEL4 to a logic high state. The activation of G_SEL4 enables the fourth gate driver group 328 to drive the fourth group of gate lines $g4_A$-$g4_D$ in response to gate pulses G_PLS5-G_PLS8.

The fourth gate driver group 328 may drive gate line $g4_A$, at time $t_{12}$, for the duration in which G_SEL4 and G_PLS5 are concurrently asserted (e.g., from times $t_{12}$ to $t_{13}$). The fourth gate driver group 328 may drive gate line $g4_B$, at time $t_{13}$, for the duration in which G_SEL4 and G_PLS6 are concurrently asserted (e.g., from times $t_{13}$ to $t_{14}$). The fourth gate driver group 328 may drive gate line $g4_C$, at time $t_{14}$, for the duration in which G_SEL4 and G_PLS7 are concurrently asserted (e.g., from times $t_{14}$ to $t_{15}$). The fourth gate driver group 328 may drive gate line $g4_D$, at time $t_{15}$, for the duration in which G_SEL4 and G_PLS8 are concurrently asserted (e.g., from times $t_{15}$ to $t_{16}$).

At time $t_{16}$, the third gate clock signal G_CLKC transitions to a logic low state while the first gate clock signal G_CLKA transitions to a logic high state. The falling-edge transition of G_CLKC causes the third SR stage 316 to shift-in the current state of G_SEL2. Since G_SEL2 is currently deasserted to a logic low state, at time $t_{16}$, the third SR stage 316 also pulls G_SEL3 to a logic low state. The rising-edge transition of G_CLKA causes the first SR stage 312 to shift-in the current state of S_PLS. However, since S_PLS is still in a logic low state, at time $t_{16}$, the first SR stage 312 may continue to hold G_SEL1 in the logic low state.

At time $t_{17}$, the fourth gate clock signal G_CLKD transitions to a logic low state while the second gate clock signal G_CLKB transitions to a logic high state. The falling-edge transition of G_CLKD causes the fourth SR stage 318 to shift-in the current state of G_SEL3. Since G_SEL3 is currently deasserted to a logic low state, at time $t_{17}$, the fourth SR stage 318 also pulls G_SEL4 to a logic low state. The rising-edge transition of G_CLKB causes the second SR stage 314 to shift-in the current state of G_SEL1. However, since G_SEL1 is still in a logic low state, at time $t_{17}$, the second SR stage 314 may continue to hold G_SEL2 in the logic low state.

In the example of FIG. 4A, the gate clock signals G_CLKA-G_CLKD at least partially overlap one another. For example, G_CLKA remains asserted for at least part of the duration in which G_CLKB is asserted, G_CLKB remains asserted for at least part of the duration in which G_CLKC is asserted, G_CLKC remains asserted for at least part of the duration in which G_CLKD is asserted, and G_CLKD remains asserted for at least part of the duration in which G_CLKA is asserted. However, the gate pulses G_PLS1-G_PLS8 are asserted for such short durations that none of the gate pulses G_PLS1-G_PLS8 overlap. This enables the hierarchical gate driver circuit 300 to drive multiple gate lines, in succession, during a single clock cycle of a particular gate clock signal. In some embodiments, each of the gate driver groups 322-328 may completely pull each gate line to a logic low state before driving the next gate line to a logic high state.

Furthermore, because the outputs of the SR stages 312-318 are used to enable the gate driver groups 322-328, rather than directly drive a load (e.g., a row of pixel elements), the hierarchical gate driver circuit 300 may scan the rows of a pixel array with greater speed and flexibility than that of existing gate driver circuits. For example, since the input of the second SR stage 314 is not tied to any of the first group of gate lines $gl_A$-$gl_D$, the second SR stage 314 may drive the second group select line G_SEL2 without having to wait for any of the gate lines $gl_A$-$gl_D$ to be driven to a sufficiently high voltage (e.g., $\geq V_{GH}$). This may allow the hierarchical gate driver circuit 300 to perform a scanning operation with coarser granularity and/or greater precision (e.g., as described in greater detail with respect to FIG. 7).

Figure 5:
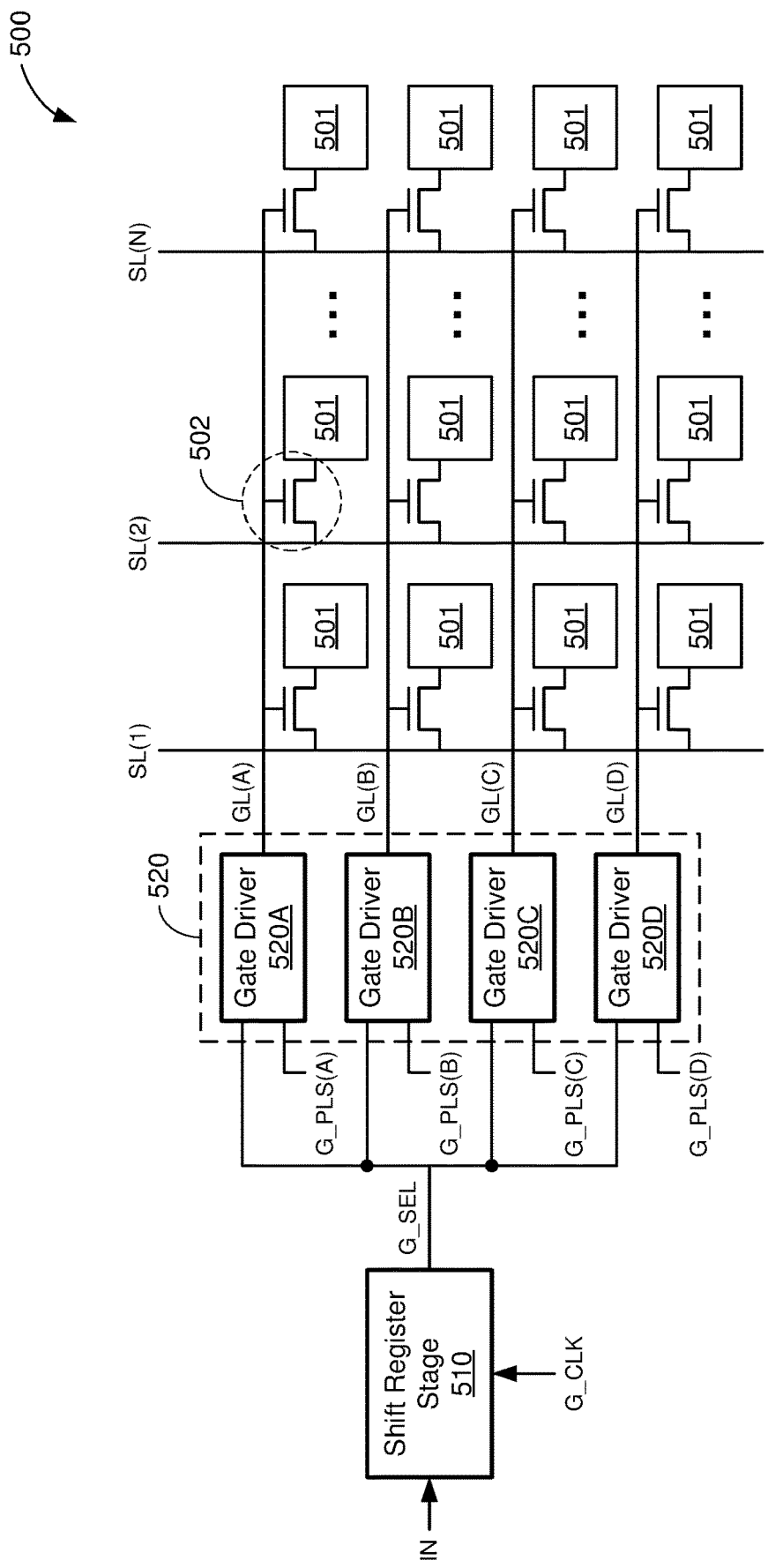
FIG. 5 is a block diagram depicting a portion of a display device, in accordance with some embodiments.

FIG. 5 is a block diagram depicting a display device 500, in accordance with some embodiments. For example, the display device 500 may be an embodiment of the display device 200 of FIG. 2. The display device 500 includes a shift register stage 510, a gate driver group 520, and a plurality of pixel elements 501. The pixel elements 501 may comprise at least a portion of the pixel array 210. The shift register stage 510 and gate driver group 520 may comprise at least a portion of the hierarchical gate driver 214 and/or the hierarchical gate driver circuit 300 of FIG. 3. In the example of FIG. 5, only one shift register stage 510 and one gate driver group 520 is shown for simplicity. However, in actual implementations, the display device 500 may include fewer or more shift register stages and/or gate driver groups than what is depicted in FIG. 3.

The pixel elements 501 may comprise display pixels (e.g., liquid crystal capacitors), photodiodes (e.g., for image sensing), sensor electrodes (e.g., for capacitive sensing), or any combination thereof. In the example of FIG. 5, the pixel elements 501 are arranged in rows and columns. Each row of pixel elements 501 is coupled to a respective gate line (GL) and each column of pixel elements 501 is coupled to a respective source line (SL). More specifically, each pixel element 501 is coupled to one of the gate lines GL(A)-GL(D) and one of the source lines SL(1)-SL(N) via an access transistor 502. In the example of FIG. 5, the access transistor 502 is an NMOS transistor having a gate terminal coupled to a corresponding gate line and a drain terminal coupled to a corresponding source line. The pixel element 501 is coupled to the source terminal of the access transistor 502.

In some embodiments, the shift register stage 510 and gate driver group 520 may control activation of the gate lines GL(A)-GL(D) in a hierarchical manner. For example, the shift register stage 510 may drive a group select line (G_SEL) based at least in part on an input signal (IN) and a corresponding gate clock signal (G_CLK). As described above with respect to FIG. 3, the input signal IN may correspond to a start pulse (e.g., if the shift register stage 510 corresponds to the first stage in a cascade) or the output of a previous shift register stage in the cascade. The shift register stage 510 may drive the group select line G_SEL when the input signal IN is asserted to a logic high state and the gate clock signal G_CLK also transitions to a logic high state. Activation of the group select line G_SEL enables the gate driver group 520 to drive the individual gate lines GL(A)-GL(D).

In some embodiments, the gate driver group 520 may comprise a plurality of gate driver elements 520A-520D. Each of the gate driver elements 520A-520D may be configured to drive a respective one of the gate lines GL(A)-GL(D) when the group select line G_SEL is activated. In some aspects, the gate driver elements 520A-520D may drive the gate lines GL(A)-GL(D) based on a plurality of gate pulses (G_PLS(A)-G_PLS(D)). For example, the first gate driver element 520A may drive a relatively high gate voltage (e.g., $\geq V_{GH}$) onto the first gate line GL(A) for the duration in which G_SEL and G_PLS(A) are concurrently asserted to a logic high state. Activation of the first gate line GL(A) turns on the access transistors 502 for the first row of pixel elements 501, thus allowing pixel data to be driven onto the first row of pixel elements 501 (e.g., coupled to GL(A)) via the source lines SL(1)-SL(N).

The second gate driver element 520B may drive a relatively high gate voltage (e.g., $\geq V_{GH}$) onto the second gate line GL(B) for the duration in which G_SEL and G_PLS(B) are concurrently asserted to a logic high state. Activation of the second gate line GL(B) turns on the access transistors 502 for the second row of pixel elements 501, thus allowing pixel data to be driven onto the second row of pixel elements 501 (e.g., coupled to GL(B)) via the source lines SL(1)-SL(N). In some aspects (e.g., as described with respect to the timing diagram of FIG. 4A), the first gate pulse G_PLS(A) may be deasserted to a logic low state before the second gate pulse G_PLS(B) is asserted to a logic high state. Thus, the first gate driver element 520A may deactivate the first gate line GL(A) (e.g., by pulling the gate voltage $\leq V_{GL}$) before the second gate line GL(B) is activated.

The third gate driver element 520C may drive a relatively high gate voltage (e.g., $\geq V_{GH}$) onto the third gate line GL(C) for the duration in which G_SEL and G_PLS(C) are concurrently asserted to a logic high state. Activation of the third gate line GL(C) turns on the access transistors 502 for the third row of pixel elements 501, thus allowing pixel data to be driven onto the third row of pixel elements 501 (e.g., coupled to GL(C)). In some aspects, the second gate pulse G_PLS(B) may be deasserted to a logic low state before the third gate pulse G_PLS(C) is asserted to a logic high state. Thus, the second gate driver element 520B may deactivate the second gate line GL(B) (e.g., by pulling the gate voltage ≤$V_{GL}$) before the third gate line GL(C) is activated.

The fourth gate driver element 520D may drive a relatively high gate voltage (e.g., ≥$V_{GH}$) onto the fourth gate line GL(D) for the duration in which G_SEL and G_PLS(D) are concurrently asserted to a logic high state. Activation of the fourth gate line GL(D) turns on the access transistors 502 for the fourth row of pixel elements 501, thus allowing pixel data to be driven onto the fourth row of pixel elements 501 (e.g., coupled to GL(D)). In some aspects, the third gate pulse G_PLS(C) may be deasserted to a logic low state before the fourth gate pulse G_PLS(D) is asserted to a logic high state. Thus, the third gate driver element 520C may deactivate the third gate line GL(C) (e.g., by pulling the gate voltage ≤$V_{GL}$) before the fourth gate line GL(D) is activated.

It is noted that, in order to drive each row of pixel elements 501 in quick succession (e.g., within half the duration that G_CLK is asserted), the gate driver elements 520A-520D should allow the full voltage swing of the gate pulses G_PLS(A)-G_PLS(D) to be driven onto the gate lines GL(A)-GL(D). However, the voltage on the group select line G_SEL may power each of the gate driver elements 520A-520D in driving the corresponding gate lines GL(A)-GL(D). Thus, the voltage on the group select line G_SEL may limit the amount of "turn-on" voltage that may be used to drive the gate lines GL(A)-GL(D). In some embodiments, each of the gate driver elements 520A-520D may be configured to "boost" the voltage on the group select line G_SEL to allow the full voltage swing of the gate pulses G_PLS(A)-G_PLS (D) to be driven onto the gate lines GL(A)-GL(D). In some aspects, one or more of the gate driver elements 520A-520D may comprise a complementary MOS (CMOS) inverter. In other aspects, one or more of the gate driver elements 520A-520D may comprise a boosted NMOS driver or a boosted PMOS driver.

Figure 6:
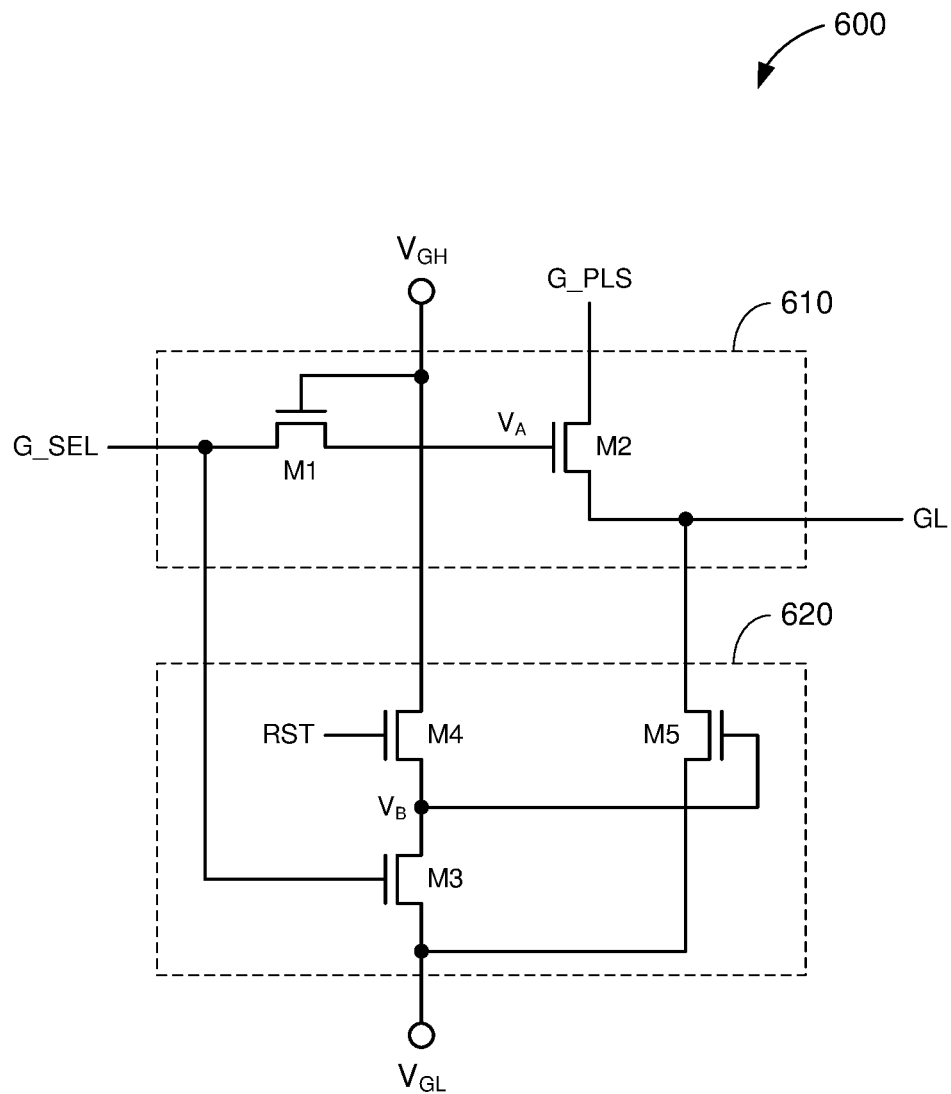
FIG. 6 is a circuit diagram depicting a boosted gate driver circuit, in accordance with some embodiments.

FIG. 6 is a circuit diagram depicting a boosted gate driver circuit 600, in accordance with some embodiments. For example, the boosted gate driver circuit 600 may be an embodiment of one of the gate driver elements 520A-520D of FIG. 5. The boosted gate driver circuit 600 includes a boosted NMOS driver 610 and a pull-down circuit 620. In the example of FIG. 6, only one boosted NMOS driver 610 is shown for simplicity. However, in actual implementations, multiple boosted NMOS drivers (such as boosted NMOS driver 610) may be coupled in parallel to the pull-down circuit 620.

The boosted NMOS driver 610 may be configured to drive a relatively high gate voltage (e.g., ≥$V_{GH}$) onto a gate line (GL) in a relatively short amount of time. In some embodiments, the boosted NMOS driver 610 may "bootstrap" a voltage onto the gate line GL based on the voltage of a group select line (G_SEL) and a corresponding gate pulse (G_PLS). The boosted NMOS driver 610 includes a set of transistors M1 and M2. In the example of FIG. 6, each of the transistors M1 and M2 is an NMOS transistor. However, in other implementations, one or more of the transistors M1 and/or M2 may be a PMOS transistor. The first transistor M1 has a drain terminal coupled to the group select line G_SEL and a gate terminal coupled to a gate turn-on voltage ($V_{GH}$). The second transistor M2 has a drain terminal coupled to receive the gate pulse G_PLS and a gate terminal coupled to the source terminal of the first transistor M1. The source terminal of the second transistor M2 is coupled to the gate line GL.

The pull-down circuit 620 may be configured to pull the gate line GL to a relatively low gate voltage (e.g., ≤$V_{GL}$) when another group select line (e.g., for a different gate driver group) is activated. The pull-down circuit 620 includes a number of transistors M3-M5. In the example of FIG. 6, each of the transistors M3-M5 is an NMOS transistor. However, in other implementations, one or more of the transistors M3-M5 may be a PMOS transistor. The third transistor M3 has a source terminal coupled to a gate turn-off voltage ($V_{GL}$) and a gate terminal coupled to the group select line G_SEL. The drain terminal of the third transistor M3 is coupled to the source terminal of the fourth transistor M4 and the gate terminal of the fifth transistor M5. The fourth transistor M4 has a drain terminal coupled to $V_{GH}$ and a gate terminal coupled to receive a reset signal line RST. The fifth transistor M5 has a drain terminal coupled to the gate line GL and a source terminal coupled to $V_{GL}$.

When activated, the group select line G_SEL may be driven to a power supply rail (e.g., $V_{DD}$). Since the first transistor M1 is constantly on, at least some of the voltage on the select line G_SEL is passed through to the gate terminal of the second transistor M2 (e.g., $V_A = V_{DD} - V_T$, where $V_T$ is a threshold voltage drop associated with the first transistor M1). The voltage $V_A$ may provide a relatively weak turn-on voltage for the second transistor M2. However, as the gate pulse G_PLS transitions from a logic low state to a logic high state, the voltage at the source terminal of second transistor M2 also begins to rise. Due to the gate-to-source capacitance of the second transistor M2, the rise in voltage at the source terminal of M2 causes a corresponding rise in voltage at the gate terminal of M2 (e.g., $V_A$). When the voltage $V_A$ exceeds the voltage on the group select line G_SEL (e.g., $V_{DD}$), the first transistor M1 acts as a diode to prevent the voltage $V_A$ from discharging to $V_{DD}$. As a result, the voltage $V_A$ may be boosted well above the drain voltage of M2. This may allow the full voltage swing of the gate pulse G_PLS (e.g., $V_{DD}$) to be passed through the second transistor M2 (e.g., without a threshold voltage drop otherwise associated with the second transistor M2), thus driving the gate line GL with sufficient voltage to turn on any access transistors coupled thereto (e.g., access transistors 502 of FIG. 5).

Activation of the group select line G_SEL also causes the third transistor M3 to turn on. The third transistor M3 pulls the gate voltage of the fifth transistor M5 low (e.g., $V_B = V_{GL}$), thus preventing the fifth transistor M5 from turning on and otherwise discharging the voltage on the gate line GL (e.g., to $V_{GL}$). In some embodiments, the reset signal line RST may receive a gate clock signal that is 180 degrees out of phase with the gate clock signal used to drive the group select line G_SEL. With reference for example to FIG. 3, assuming the group select line G_SEL is driven based on the first gate clock signal G_CLKA, then the reset signal line RST may be coupled to receive the third gate clock signal G_CLKC (e.g., which is 180 degrees out of phase with G_CLKA). This ensures that the fourth transistor M4 and the third transistor M3 are never turned on at the same time. This also ensure that the gate voltage of the first transistor M1 is never pulled low (e.g., the first transistor M1 remains on at all times).

When the group select line G_SEL is deactivated (e.g., pulled to ground potential), the voltage $V_A$ drops well below the gate turn-on voltage for the second transistor M2. This causes the second transistor M2 to shut off, thus preventing any subsequent voltage swings in the gate pulse G_PLS from driving the gate line. Deactivation of the group select line G_SEL also turns off the third transistor M3, thereby disconnecting the gate voltage of the fifth transistor M5 from $V_{GL}$. As described above, the reset signal line RST may receive a signal that is 180 degrees out of phase with the signal used to drive the group select line G_SEL. Thus, when the group select line G_SEL is deactivated, the reset signal line RST becomes activated, causing the fourth transistor M4 to turn on. The fourth transistor M4 pulls the gate voltage of the fifth transistor M5 high (e.g., $V_B=V_{GH}$), thereby turning on the fifth transistor M5. As a result, the fifth transistor M5 pulls the voltage on the gate line GL to $V_{GL}$. This ensures that the gate line GL cannot be driven while another group of pixel elements are selected.

Figure 7:
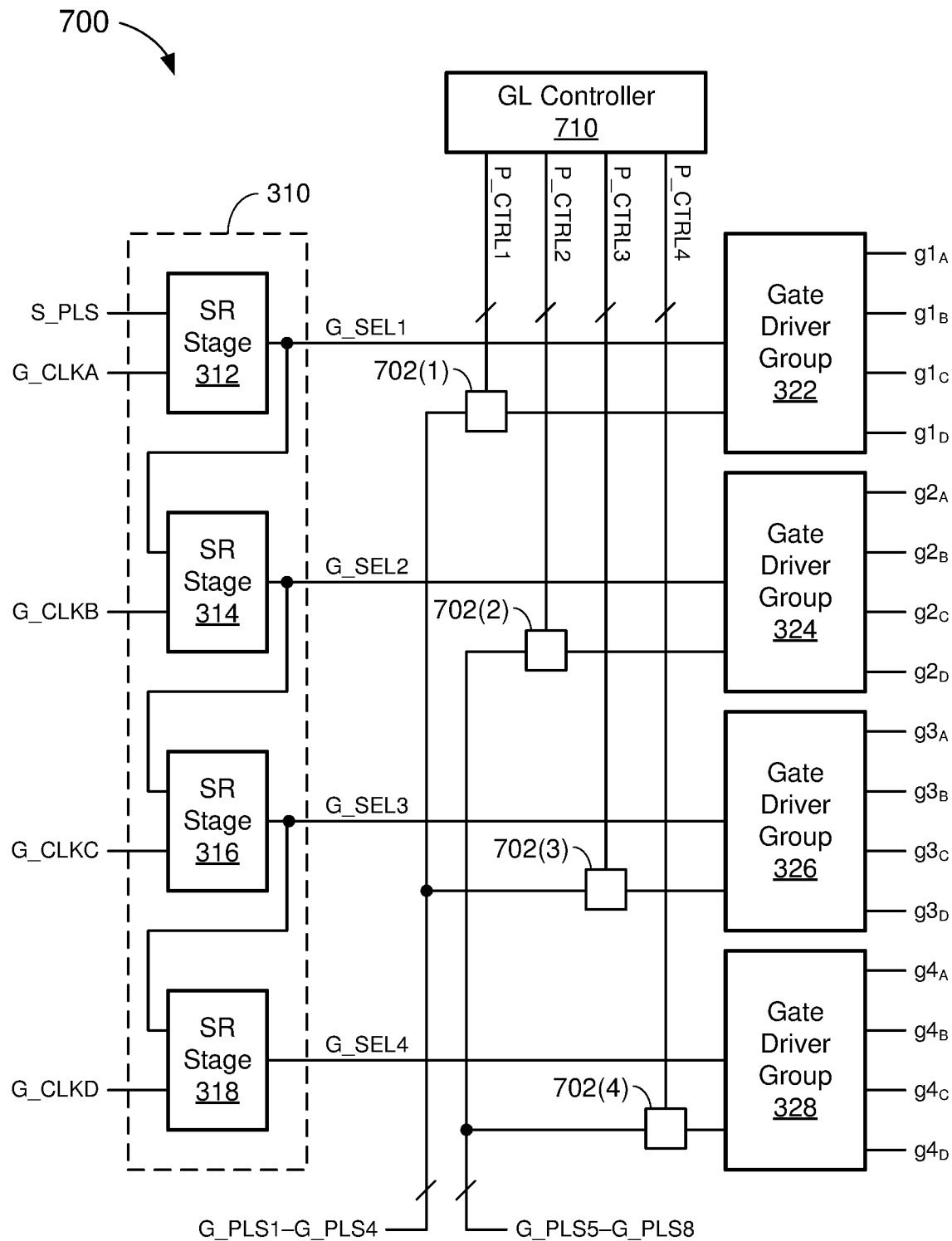
FIG. 7 is a block diagram of a hierarchical gate driver circuit, in accordance with some other embodiments.

FIG. 7 is a block diagram of a hierarchical gate driver circuit 700, in accordance with some other embodiments. For example, the hierarchical gate driver circuit 700 may be an embodiment of the hierarchical gate driver 214 shown in FIG. 2. More specifically, the hierarchical gate driver circuit 700 may be an alternative embodiment of the hierarchical gat driver circuit 300 of FIG. 3. For example, the hierarchical gate driver circuit 700 may include the shift register 310 and gate driver groups 322-328 described above with respect to FIG. 3. In addition, the hierarchical gate driver circuit 700 may include a gate line (GL) controller 710 to control the flow of the gate pulses G_PLS1-G_PLS8 to the gate driver groups 322-328.

In some embodiments, the GL controller 710 may suppress one or more of the gate pulses G_PLS1-G_PLS8 intended for the gate driver groups 322-328. For example, the GL controller 710 may prevent one or more gate driver elements from driving respective gate lines by suppressing the gate pulses used to drive the corresponding gate driver elements. In some aspects, the GL controller 710 may be coupled to a plurality of pulse filters 702(1)-702(4). Each of the pulse filters 702(1)-702(4) may selectively suppress the gate pulses provided to a respective one of the gate driver groups 322-328. The GL controller 710 may control the pulse filters 702(1)-702(4) via a plurality of pulse control signals P_CTRL1-P_CTRL4.

In some embodiments, each of the pulse filters 702(1)-702(4) may comprise a set of AND logic gates. For example, the first pulse filter 702(1) may provide the gate pulses G_PLS1-G_PLS4 to the first gate driver group 322 only when the first set of pulse control signals P_CTRL1 are asserted. The second pulse filter 702(2) may provide the gate pulses G_PLS5-G_PLS8 to the second gate driver group 324 only when the second set of pulse control signals P_CTRL2 are asserted. The third pulse filter 702(3) may provide the gate pulses G_PLS1-G_PLS4 to the third gate driver group 326 only when the third set of pulse control signals P_CTRL3 are asserted. The fourth pulse filter 702(4) may provide the gate pulses G_PLS5-G_PLS8 to the fourth gate driver group 328 only when the fourth set of pulse control signals P_CTRL4 are asserted.

If one or more of the first set of pulse control signals P_CTRL1 are deasserted, the first pulse filter 702(1) may suppress a corresponding one or more of the gate pulses G_PLS1-G_PLS4. If one or more of the second set of pulse control signals P_CTRL2 are deasserted, the second pulse filter 702(2) may suppress a corresponding one or more of the gate pulses G_PLS5-G_PLS8. If one or more of the third set of pulse control signals P_CTRL3 are deasserted, the third pulse filter 702(3) may suppress a corresponding one or more of the gate pulses G_PLS1-G_PLS4. If one or more of the fourth set of pulse control signals P_CTRL4 are deasserted, the fourth pulse filter 702(4) may suppress a corresponding one or more of the gate pulse G_PLS5-G_PLS8.

In some other embodiments, the GL controller 710 may redistribute one or more of the gate pulses G_PLS1-G_PLS8 among the gate driver elements within each of the gate driver groups 322-328. For example, the first pulse filter 702(1) may suppress gate pulses G_PLS2-G_PLS4 from being delivered to the first gate driver group 322 in response to a first set of P_CTRL1 signals received from the GL controller 710. In response to a second set of P_CTRL1 signals, the pulse filter 702(1) may redistribute the first gate pulse G_PLS1 to each of the gate driver elements in the first gate driver group 322. As a result, each of the gate lines $g1_A$-$g1_D$ coupled to the first gate driver group 322 may be driven, concurrently, in response to the same gate pulse (e.g., G_PLS1).

Among other advantages, the hierarchical gate driver circuit 700 may scan an array of display pixels with greater speed and/or flexibility than existing gate driver circuitry. In some embodiments, the GL controller 710 may suppress one or more of the gate pulses G_PLS1-G_PLS8 to perform a targeted scan for an input object in a particular region of the display. In other embodiments, the GL controller 710 may suppress one or more of the gate pulses G_PLS1-G_PLS8 to prevent visual artifacts when sensor electrodes (coinciding with the display) are driven for capacitive sensing. In some other embodiments, the GL controller 710 may suppress one or more gate pulses used to drive photodiodes when performing a display update, and may suppress one or more gate pulses used to drive display pixels when performing an optical scan. Still further, in some embodiments, the GL controller 710 may redistribute at least one of the gate pulses G_PLS1-G_PLS8 to two or more driver elements to perform lower-resolution display updates.

Fingerprint Scanning

In some implementations, the hierarchical gate driver circuit 700 may be coupled to an array of photodiodes (or photosensors) configured to detect and/or identify one or more features of an input object. For example, where the input object is a user's finger, the photodiodes may be driven to scan a fingerprint of the user. In some aspects, the fingerprint may overlap or coincide with a relatively small region of the display. Thus, it may be an inefficient use of time and/or resources to scan the entire pixel array for the user's fingerprint.

In some embodiments, the GL controller 710 may selectively suppress one or more of the gate driver groups 322-328 based at least in part on a presence of an input object in a region coinciding with an array of pixel elements. For example, the input object may be detected in a region of the display overlapping gate lines $g3_A$-$g3_D$. Thus, rather than drive each of the gate lines $g1_A$-$g4_D$ to scan the user's fingerprint. The GL controller 710 may suppress the gate pulses G_PLS1-G_PLS4 from being delivered to the first gate driver group 322 (e.g., via the first pulse filter 702(1)), and may suppress gate pulses G_PLS5-G_PLS8 from being delivered to the second gate driver group 324 (e.g., via the second pulse filter 702(2)). The GL controller 710 may enable the gate pulses G_PLS1-G_PLS4 to be delivered to the third gate driver group 326 (e.g., via the third pulse filter 702(3)). The GL controller 710 may further suppress gate pulses G_PLS5-G_PLS8 from being delivered to the fourth gate driver group 328 (e.g., via the fourth pulse filter 702(4)).

As a result, the hierarchical gate driver circuit 700 may perform a "fast scan" of the upper portion of the pixel array (e.g., coinciding with gate lines $g1_A$-$g2_D$). For example, each of the SR stages 312-318 may continue to drive their respective group select lines G_SEL1-G_SEL4 in succession. However, because these group select lines G_SEL1-G_SEL4 do not drive a load, the SR stages 312-318 may drive the group select lines G_SEL1-G_SEL4 in relatively fast succession. Furthermore, because gate pulses G_PLS1-G_PLS4 are suppressed by the first pulse filter 702(1), and gate pulses G_PLS5-G_PLS8 are suppressed by the second pulse filter 702(2), the gate driver groups 322 and 324 are prevented from driving the gate lines $g1_A$-$g2_D$ when the group select lines G_SEL1 and G_SEL2 are activated. This effectively reduces the amount of time needed to advance the "scan" past the rows of pixels elements coupled to gate lines $g1_A$-$g2_D$.

When the third group select line G_SEL3 is activated, the third gate driver group 326 may proceed to drive each of the gate lines $g3_A$-$g3_D$, in succession, based on the gate pulses G_PLS1-G_PLS4. Since each of the gate lines $g3_A$-$g3_D$ is used to drive a load (e.g., a row of photodiodes), the third gate driver group 326 may scan the rows of pixel elements coupled to gate lines $g3_A$-$g3_D$ at a normal scanning rate. However, because gate pulses G_PLS5-G_PLS8 are suppressed by the fourth pulse filter 702(4), the fourth gate driver group 328 is prevented from driving the gate lines $g4_A$-$g4_D$ when the fourth group select line G_SEL4 is activated. As described above, this may reduce the amount of time needed to advance the "scan" past the rows of pixel elements coupled to gate lines $g4_A$-$g4_D$ (e.g., and to complete the scan).

By performing a normal scan of a "targeted" region of the display (e.g., coinciding with gate lines $g3_A$-$g3_D$), and a fast scan of the regions surrounding the targeted region, the hierarchical gate driver circuit 700 may substantially reduce the amount of time needed to scan an input object (e.g., compared to existing gate driver circuitry). More specifically, the hierarchical design of the gate driver circuit 700 enables the SR stages 312-318 to continue driving the group select lines G_SEL1-G_SEL4, in succession, independent of whether any of the gate lines $g1_A$-$g4_D$ are driven by the gate driver groups 322-328. This allows the hierarchical gate driver circuit 700 to dynamically adjust the rate at which scanning operations are performed in the pixel array, while continuing to maintain timing synchronization with a reference clock signal (e.g., R_CLK of FIG. 2).

In-Cell Touch Sensing

In some implementations, the hierarchical gate driver circuit 700 may be coupled to an array of display pixels overlapping a plurality of sensor electrodes (e.g., configured for capacitive touch sensing). When a display device performs capacitive sensing while a display update is in progress, the display device may pause the updating of the display pixels in the region coinciding with the capacitive sensing. This is to prevent the voltage on the gate lines from interfering with the electric fields of the sensor electrodes.

With reference for example to FIG. 2, if sensor electrodes are being driven in a region of the display coinciding with the gate lines GL(6)-GL(8), the display device may refrain from updating the display pixels coupled to gate lines GL(6)-GL(8) until the capacitive sensing operation is completed. Existing gate driver circuitry would pause the display update by holding the shift register coupled to the preceding gate line (e.g., gate line GL(5)) while the capacitive sensing was performed, and resuming or restarting the scan once the capacitive sensing operation was completed. However, shift registers are configured to operate dynamically. Thus, when a shift register is held for a longer period than usual, the voltage on the corresponding (e.g., "paused") gate line may start to change. Moreover, the paused gate line may have an activation time that differs substantially from that of other gate lines driven in succession. Such conditions may cause visual artifacts to appear at the paused gate lines.

In some embodiments, the hierarchical gate driver circuit 700 may prevent the occurrence of visual artifacts by performing a fast scan of the pixel array (e.g., rather than pause the scan) when a capacitive sensing operation is being performed. For example, if sensor electrodes are being driven in a region of the display coinciding with the gate lines $g3_A$-$g3_D$, the GL controller 710 may enable the gate driver groups 322 and 324 to proceed to update the gate lines $g1_A$-$g2_D$ in normal fashion. However, when the scan advances to the gate lines $g3_A$-$g3_D$, rather than hold the voltage on the preceding gate line $g2_D$, the GL controller 710 may switch to a fast scanning mode. For example, when operating in a fast scanning mode, the GL controller 710 may suppress the gate pulses G_PLS1-G_PLS8 via one or more of the pulse filters 702(1)-702(4). This prevents the gate driver groups 322-328 from driving the gate lines $g1_A$-$g4_D$ (e.g., which would otherwise interfere with the sensor electrodes), while allowing the shift register 310 to continue driving the group select lines G_SEL1-G_SEL4 in synchronization with a reference clock signal.

In some embodiments, the hierarchical gate driver circuit 700 may resume updating the display (e.g., after the capacitive sensing operation is completed) by "replaying" the scan right before the last gate line to be driven. For example, the GL controller 710 may suppress gate pulses G_PLS1-G_PLS4 from being delivered to the third gate driver group 326 (e.g., via the third pulse filter 702(3)), and may suppress gate pulses G_PLS5-G_PLS8 from being delivered to the fourth gate driver group 328 (e.g., via the fourth pulse filter 702(4)), while the sensor electrodes are being driven for capacitive sensing. This allows the hierarchical gate driver circuit 700 to fast-scan the rows of pixel elements coupled to gate lines $g3_A$-$g4_D$ (e.g., by driving the group select lines G_SEL3 and G_SEL4, in succession, but not the corresponding gate lines $g3_A$-$g4_D$). When the fast scan reaches the bottom of the pixel array, the hierarchical gate driver circuit 700 may restart the scan (e.g., still in fast scanning mode) from the top of the pixel array.

For example, in the subsequent iteration of the scan, the GL controller 710 may suppress gate pulses G_PLS1-G_PLS4 from being delivered to the first gate driver group 322 (e.g., via the first pulse filter 702(1)). This allows the hierarchical gate driver circuit 700 to fast-scan the rows of pixel elements coupled to gate lines $g1_A$-$g1_D$. The GL controller 710 may also suppress gate pulses G_PLS5-G_PLS7 from being delivered to the second gate driver group 324 (e.g., via the second pulse filter 702(2)). This allows the hierarchical gate driver circuit 700 to fast-scan the rows of pixel elements coupled to gate lines $g2_A$-$g2_C$. However, the GL controller 710 may allow gate pulse G_PLS8 to pass through the second pulse filter 702(2). Thus, when the second group select line G_SEL2 is activated and the gate pulse G_PLS8 transitions to a logic high state, the gate driver group 324 may once again drive a corresponding voltage onto the gate line $g2_D$. More specifically, the GL controller 710 may replay the updating of the display pixels coupled to gate line $g2_D$ and resume a normal scanning of the remaining rows of the pixel array (e.g., coupled to gate lines $g3_A$-$g4_D$).

By performing a fast scan of the pixel array while a capacitive sensing operation is being performed, the hierarchical gate driver circuit 700 may reduce and/or eliminate visual artifacts that would otherwise occur where the display update is paused. More specifically, the hierarchical design of the gate driver circuit 700 enables the SR stages 312-318 to continue driving the group select lines G_SEL1-G_SEL4, in succession, independent of whether any of the gate lines $g1_A$-$g4_D$ are driven by the gate driver groups 322-328. This allows the hierarchical gate driver circuit 700 to pause updating the display, while a capacitive sensing operation is being performed, without having to hold the voltage of any of the gate lines $g1_A$-$g4_D$. Because the paused gate line (e.g., gate line $g2_D$) is not held for an extended duration, and has an activation time (e.g., even when replaying the scan) substantially similar to that of other gate lines driven in succession, the effects of visual artifacts may be substantially reduced and/or eliminated.

Combination Pixel Array

In some implementations, the hierarchical gate driver circuit 700 may be coupled to an array of pixel elements that includes display pixels and photodiodes. Display pixels and photodiodes are typically driven at different times (e.g., to avoid interference). However, because the gate lines are directly driven by the outputs of the shift register (e.g., in existing gate driver circuitry), existing display devices require at least two gate driver circuits (e.g., with independent shift registers) to drive an array of pixel elements that includes a combination of display pixels and photodiodes.

In some embodiments, the hierarchical gate driver circuit 700 may be coupled to one or more rows of display pixels and one or more rows of photodiodes. With reference for example to FIG. 7, the upper two gate lines driven by each of the gate driver groups 322-328 may be coupled to respective rows of display pixels, and the lower two gate lines driven by each of the gate driver groups 322-328 may be coupled to respective rows of photodiodes. For example, each of the gate lines $g1_A$, $g1_B$, $g2_A$, $g2_B$, $g3_A$, $g3_B$, $g4_A$, and $g4_B$ may be coupled to a respective row of display pixels. Furthermore, each of the gate lines $g1_C$, $g1_C$, $g2_C$, $g2_D$, $g3_C$, $g3_D$, $g4_C$, and $g4_D$ may be coupled to a respective row of photodiodes.

When updating a visual interface of the display, the GL controller 710 may suppress gate pulses G_PLS3 and G_PLS4 via the first pulse filter 702(1) and the third pulse filter 702(3). The GL controller 710 may further suppress gate pulses G_PLS7 and G_PLS8 via the second pulse filter 702(2) and the fourth pulse filter 702(4). Thus, when the first group select line G_SEL1 is activated, the first gate driver group 322 may drive only the gate lines $g1_A$ and $g1_B$ coupled to respective rows of display pixels. When the second group select line G_SEL2 is activated, the second gate driver group 324 may drive only the gate lines $g2_A$ and $g2_B$ coupled to respective rows of display pixels. When the third group select line G_SEL3 is activated, the third gate driver group 326 may drive only the gate lines $g3_A$ and $g3_B$ coupled to respective rows of display pixels. When the fourth group select line G_SEL4 is activated, the fourth gate driver group 328 may drive only the gate lines $g4_A$ and $g4_B$ coupled to respective rows of display pixels.

When acquiring optical sensing information, the GL controller 710 may suppress gate pulses G_PLS1 and G_PLS2 via the first pulse filter 702(1) and the third pulse filter 702(3). The GL controller 710 may further suppress gate pulses G_PLS5 and G_PLS6 via the second pulse filter 702(2) and the fourth pulse filter 702(4). Thus, when the first group select line G_SEL1 is activated, the first gate driver group 322 may drive only the gate lines $g1_C$ and $g1_D$ coupled to respective rows of photodiodes. When the second group select line G_SEL2 is activated, the second gate driver group 324 may drive only the gate lines $g2_C$ and $g2_D$ coupled to respective rows of photodiodes. When the third group select line G_SEL3 is activated, the third gate driver group 326 may drive only the gate lines $g3_C$ and $g3_D$ coupled to respective rows of photodiodes. When the fourth group select line G_SEL4 is activated, the fourth gate driver group 328 may drive only the gate lines $g4_C$ and $g4_D$ coupled to respective rows of photodiodes.

Due to its hierarchical design, the hierarchical gate driver circuit 700 may drive an array of pixel elements including rows of display pixels and rows of photodiodes using a single shift register 310. For example, by selectively suppressing one or more of the gate pulses G_PLS1-G_PLS8, the hierarchical gate driver circuit 700 may drive only the gate lines coupled to respective display pixels during one iteration of the gate clocks G_CLKA-G_CLKD, and may drive only the gate lines coupled to respective photodiodes during another iteration of the gate clocks G_CLKA-G_CLKD. This may further reduce the footprint of display devices having a combination of display pixels and photodiodes.

Foveated Display Rendering

In some implementations, the hierarchical gate driver circuit 700 may be coupled to an array of display pixels for a foveated display. For example, a foveated display may be configured to dynamically adjust the resolution of the array based on a user's eye position. More specifically, the foveated display may render a portion of the display coinciding with a fixation point of the user (e.g., a point and/or region in which the user's eyes are focused) with higher resolution than other regions of the display. With reference for example to FIG. 7, if the user is fixated on a region coinciding with gate lines $g3_A$-$g3_D$, the foveated display may render the pixel elements coupled to gate lines $g3_A$-$g3_D$ with higher resolution than the pixel elements coupled to gate lines $g1_A$-$g2_D$ and/or pixel elements coupled to gate lines $g4_A$-$g4_D$.

In some embodiments, the hierarchical gate driver circuit 700 may dynamically adjust the resolution for an array of display pixels by suppressing and/or redistributing one or more of the gate pulses G_PLS1-G_PLS8. For example, when the user's fixation point coincides with a region overlapping gate lines $g3_A$-$g3_D$, the GL controller 710 may reduce the resolution of the display pixels in the periphery of the fixation point by suppressing one or more of the gate pulses G_PLS1-G_PLS8 via the pulse filters 702(1), 702(2), and 702(4). In some aspects, the GL controller 710 may halve the resolution of the display pixels in the periphery of the fixation point by suppressing gate pulses G_PLS2 and G_PLS4 via the first pulse filter 702(1), suppressing gate pulses G_PLS6 and G_PLS8 via the second pulse filter 702(2), and suppressing gate pulses G_PLS2 and G_PLS4 via the fourth pulse filter 702(4).

The GL controller 710 may further redistribute the remaining gate pulses such that each adjacent pair of gate lines is driven in response to the same gate pulse. For example, the first gate driver group 322 may drive gate lines $g1_A$ and $g1_B$ concurrently in response to gate pulse G_PLS1, and may drive gate lines $g1_C$ and $g1_D$ concurrently in response to gate pulse G_PLS3. The second gate driver group 324 may drive gate lines $g2_A$ and $g2_B$ concurrently in response to gate pulse G_PLS5, and may drive gate lines $g2_C$ and $g2_D$ concurrently in response to gate pulse G_PLS7. The third gate driver group 326 may drive each of the gate lines $g3_A$-$g3_D$, in succession, in response to respective gate pulses G_PLS1-G_PLS4. The fourth gate driver group 328 may drive gate lines $g4_A$ and $g4_B$ concurrently in response to gate pulse G_PLS5, and may drive gate lines g4$_C$ and g4$_D$ concurrently in response to gate pulse G_PLS7.

By suppressing and redirecting the gate pulses G_PLS1-G_PLS8, the hierarchical gate driver circuit 700 may dynamically adjust the resolution of any region of the display. Moreover, the hierarchical design of the gate driver circuit 700 enables the SR stages 312-318 to continue driving the group select lines G_SEL1-G_SEL4, in succession, even when multiple gate lines g1$_A$-g4$_D$ are activated concurrently. This allows the hierarchical gate driver circuit 700 to dynamically adjust the resolution of pixel array, while continuing to maintain timing synchronization with a reference clock signal (e.g., R_CLK of FIG. 2).

Figure 8:
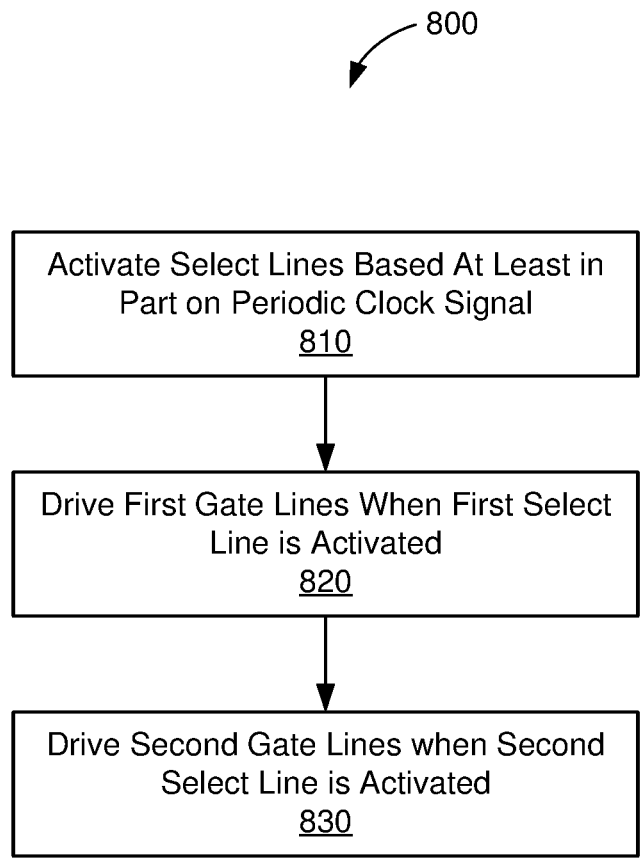
FIG. 8 is an illustrative flowchart depicting an example operation for scanning a plurality of gate lines in a hierarchical manner.

FIG. 8 is an illustrative flowchart depicting an example operation 800 for scanning a plurality of gate lines in a hierarchical manner. With reference for example to FIGS. 3 and 7, the operation 800 may be performed by any of the hierarchical gate driver circuits 300 and/or 700 described herein. More specifically, the operation 800 may be used to drive one or more of the gate lines g1$_A$-g4$_D$ (e.g., coupled to the rows of a pixel array) in a hierarchical manner.

The hierarchical gate driver circuit may first activate a plurality of select lines based at least in part on a periodic clock signal (810). For example, the shift register 310 may be configured to drive the group select lines G_SEL1-G_SEL4, in succession, based in part on the reference clock signal R_CLK. More specifically, the first SR stage 312 may be configured to drive the first group select line G_SEL1 based on the start pulse S_PLS and the first gate clock signal G_CLKA. The second SR stage 314 may be configured to drive the second group select line G_SEL2 based on G_SEL1 and the second gate clock signal G_CLKB. The third SR stage 316 may be configured to drive the third group select line G_SEL3 based on G_SEL2 and the third gate clock signal G_CLKC. The fourth SR stage 318 may be configured to drive the fourth group select line G_SEL4 based on G_SEL3 and the fourth gate clock signal G_CLKD. Each of the gate clock signals G_CLKA-G_CLKD may be generated by applying a different phase offset to the reference clock signal R_CLK.

The hierarchical gate driver circuit may drive a set of first gate lines when a first select line of the plurality of select lines is activated (820). For example, the first gate driver group 322 may be configured to selectively drive the first group of gate lines g1$_A$-g1$_D$ when the first group select line G_SEL1 is activated. In some embodiments, the first gate driver group 322 may drive the gate lines g1$_A$-g1$_D$ based at least in part on a series of gate pulses G_PLS1-G_PLS4. In some aspects, the first gate driver group 322 may successively drive each of the gate lines g1$_A$-g1$_D$ when the first group select line G_SEL1 is activated (e.g., as described with respect to FIGS. 3-5). In other aspects, the first gate driver group 322 may refrain from driving one or more of the gate lines g1$_A$-g1$_D$ even when the first group select line G_SEL1 is activated (e.g., as described with respect to FIG. 7).

The hierarchical gate driver circuit may further drive a set of second gate lines when a second select line of the plurality of select lines is activated (830). For example, the second gate driver group 324 may be configured to selectively drive the second group of gate lines g2$_A$-g2$_D$ when the second group select line G_SEL2 is activated. In some embodiments, the second gate driver groups 324 may drive the gate lines g2$_A$-g2$_D$ based at least in part on a series of gate pulses G_PLS5-G_PLS8. In some aspects, the second gate driver group 324 may successively drive each of the gate lines g2$_A$-g2$_D$ when the second group select line G_SEL2 is activated (e.g., as described with respect to FIGS. 3-5). IN other aspects, the second gate driver group 324 may refrain from driving one or more of the gate lines g2$_A$-g2$_D$ even when the second group select line G_SEL2 is activated (e.g., as described with respect to FIG. 7).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A gate driver circuit for an array of pixel elements, the gate driver circuit comprising:
    a shift register configured to activate a plurality of select lines based at least in part on a periodic clock signal, the shift register comprising:
        a first stage configured to selectively activate a first select line of the plurality of select lines based at least in part on a first phase offset of the clock signal; and
        a second stage configured to selectively activate a second select line of the plurality of select lines based at least in part on a second phase offset of the clock signal;
    a first group of gate line drivers configured to receive the first select line and drive a plurality of first gate lines when the first select line is activated, wherein each of the first gate lines is coupled to a respective row of first pixel elements in the array; and a second group of gate line drivers configured to receive the second select line and drive a plurality of second gate lines when the second select line is activated, wherein each of the second gate lines is coupled to a respective row of second pixel elements in the array.

2. The gate driver circuit of claim 1, wherein the activation of the first select line overlaps, in part, with the activation of the second select line.

3. The gate driver circuit of claim 1, wherein the second stage is configured to activate the second select line after the first select line has been activated.

4. The gate driver circuit of claim 1, wherein the first group of gate line drivers comprises a first plurality of driver elements each coupled to a respective one of the first gate lines, and wherein the second group of gate drivers comprises a second plurality of driver elements each coupled to a respective one of the second gate lines.

5. The gate driver circuit of claim 4, wherein each of the driver elements is configured to bootstrap a voltage driven onto a respective gate line.

6. The gate driver circuit of claim 5, wherein at least one of the driver elements comprises a boosted n-channel metal oxide semiconductor (NMOS) driver or a boosted p-channel metal oxide semiconductor (PMOS) driver.

7. The gate driver circuit of claim 4, wherein at least one of the driver elements comprises a complementary metal oxide semiconductor (CMOS) inverter.

8. The gate driver circuit of claim 1, wherein the first group of gate line drivers is configured to drive each of the first gate lines in succession, and wherein the second group of gate lines drivers is configured to drive each of the second gate lines in succession.

9. The gate driver circuit of claim 8, wherein the plurality of first gate lines and the plurality of second gate lines are driven at different times.

10. The gate driver circuit of claim 1, wherein each pixel element in the array comprises at least one of a display pixel, a photodiode, a capacitive sensor, or a combination thereof.

11. The gate driver circuit of claim 1, further comprising: a gate line controller configured to selectively suppress one or more gate line drivers of the first group of gate line drivers when the first select line is activated, and to selectively suppress one or more gate line drivers of the second group when the second select line is activated.

12. The gate driver circuit of claim 11, wherein the gate line controller is configured to selectively suppress at least one of the first or second groups of gate line drivers based at least in part on a presence of an input object in a region coinciding with the array of pixel elements.

13. The gate driver circuit of claim 12, wherein the gate line controller is configured to suppress the second group of gate line drivers when the input object is detected in a region coinciding with the first pixel elements in the array, and wherein the gate line controller is configured to suppress the first group of gate line drivers when the input object is detected in a region coinciding with the second pixel elements in the array.

14. The gate driver circuit of claim 11, wherein the array of pixel elements coincides with a sensing region provided by a plurality of sensor electrodes, and wherein the gate line controller is configured to suppress at least one of the first or second groups of gate line drivers when the sensor electrodes are driven for capacitive sensing.

15. The gate driver circuit of claim 14, wherein the shift register continues to activate the plurality of select lines, in succession, when the sensor electrodes are driven for capacitive sensing.

16. The gate driver circuit of claim 11, wherein the rows of first pixel elements include one or more rows of display pixels and one or more rows of photodiodes, and wherein the first group of gate line drivers comprises:

one or more display drivers each coupled to a respective row of the display pixels; and one or more sensor drivers each coupled to a respective row of the photodiodes.

17. The gate driver circuit of claim 16, wherein the gate line controller is configured to suppress the one or more sensor drivers when updating a display associated with the array of pixel elements, and wherein the gate line controller is configured to suppress the one or more display drivers when sensing objects in a sensing region associated with the array of pixel elements.

18. The gate driver circuit of claim 1, wherein the first group of gate line drivers is configured to drive two or more of the first gate lines, concurrently, when the first select line is activated, and wherein the second group of gate line drivers is configured to drive each of the second gate lines, successively, when the second select line is activated.

19. The gate driver circuit of claim 18, wherein the second pixel elements coincide with a fixation point of a user of a foveated display.

20. The gate driver circuit of claim 1, further comprising: a third group of gate line drivers configured to drive a plurality of third gate lines when a third select line of the plurality of select lines is activated, wherein each of the third gate lines is coupled to a respective row of third pixel elements in the array.

21. A display device, comprising:

an array of pixel elements;

a source driver configured to update the array of pixel elements via a plurality of source lines; and a gate driver configured to select individual rows of pixel elements to be updated, the gate driver including:

a shift register configured to activate a plurality of select lines based at least in part on a periodic clock signal, the shift register comprising:

a first stage configured to selectively activate a first select line of the plurality of select lines based at least in part on a first phase offset of the clock signal; and a second stage configured to selectively activate a second select line of the plurality of select lines based at least in part on a second phase offset of the clock signal;

a first group of gate line drivers configured to receive the first select line and drive a plurality of first gate lines when the first select line is activated, wherein each of the first gate lines is coupled to a respective row of first pixel elements in the array; and a second group of gate lines drivers configured to receive the second select line and drive a plurality of second gate lines when the second select line is activated, wherein each of the second gate lines is coupled to a respective row of second pixel elements in the array.

22. The display device of claim 21, wherein the activation of the first select line overlaps, in part, with the activation of the second select line.

23. The display device of claim 21, wherein the second stage is configured to activate the second select line after the first select line has been activated.

24. The display device of claim 21, wherein the first group of gate line drivers comprises a first plurality of driver elements each coupled to a respective one of the first gate lines, and wherein the second group of gate line drivers comprises a second plurality of driver elements each coupled to a respective one of the second gate lines.

25. The display device of claim 24, wherein each of the driver elements is configured to bootstrap a voltage driven onto a respective gate line.

26. The display device of claim 25, wherein at least one of the driver elements comprises a boosted n-channel metal oxide semiconductor (NMOS) driver or a p-channel metal oxide semiconductor (PMOS) driver.

27. The display device of claim 24, wherein at least one of the driver elements comprises a complementary metal oxide semiconductor (CMOS) inverter.

28. The display device of claim 21, wherein the first group of gate line drivers is configured to drive each of the first gate lines in succession, and wherein the second group of gate line drivers is configured to drive each of the second gate lines in succession.

29. The display device of claim 28, wherein the plurality of first gate lines and the plurality of second gate lines are driven at different times.

30. The display device of claim 21, wherein each pixel element in the array comprises at least one of a display pixel, a photodiode, a capacitive sensor, or a combination thereof.

31. The display device of claim 21, further comprising:
a gate line controller configured to selectively suppress one or more gate line drivers of the first group of gate line drivers when the first select line is activated, and to selectively suppress one or more gate line drivers of the second group when the second select line is activated.

32. The display device of claim 31, wherein the gate line controller is configured to selectively suppress at least one of the first or second groups of gate line drivers based at least in part on a presence of an input object in a region coinciding with the array of pixel elements.

33. The display device of claim 32, wherein the gate line controller is configured to suppress the second group of gate line drivers when the input object coincides with the first pixel elements in the array, and wherein the gate line controller is configured to suppress the first group of gate line drivers when the input object coincides with the second pixel elements in the array.

34. The display device of claim 31, further comprising:
a sensing region provided by a plurality of sensor electrodes and coinciding with the array of pixel elements, wherein the gate line controller is configured to suppress at least one of the first or second groups of gate line drivers when the sensor electrodes are driven for capacitive sensing.

35. The display device of claim 34, wherein the shift register continues to activate the plurality of select lines, in succession, when the sensor electrodes are driven for capacitive sensing.

36. The display device of claim 31, wherein the rows of first pixel elements include one or more rows of display pixels and one or more rows of photodiodes, and wherein the first group of gate line drivers comprises:
one or more display drivers each coupled to a respective row of the display pixels; and
one or more sensor drivers each coupled to a respective row of the photodiodes.

37. The display device of claim 36, wherein the gate line controller is configured to suppress the one or more sensor drivers when updating a display associated with the array of pixel elements, and wherein the gate line controller is configured to suppress the one or more display drivers when sensing objects in a sensing region associated with the array of pixel elements.

38. The display device of claim 21, wherein the first group of gate line drivers is configured to drive two or more of the first gate lines, concurrently, when the first select line is activated, and wherein the second group of gate line drivers is configured to drive each of the second gate lines, successively, when the select line is activated.

39. The display device of claim 38 wherein the display device is a foveated display, and wherein the second pixel elements coincide with a fixation point of a user of the foveated display.

40. The display device of claim 21, wherein the gate driver further includes:
a third group of gate line drivers configured to drive a plurality of third gate lines when a third select line of the plurality of select lines is activated, wherein each of the third gate lines is coupled to a respective row of third pixel elements in the array.

41. A method comprising:
selectively activating, by a first stage of a shift register, a first select line of a plurality of select lines based at least in part on a first phase offset of a periodic clock signal;
selectively activating, by a second stage of the shift register, a second select line off the plurality of select lines based at least in part on a second phase offset of the periodic clock signal;
driving a plurality of first gate lines when the first select line is activated, wherein each of the first gate lines is coupled to a respective row of first pixel elements in an array of pixel elements; and
driving a plurality of second gate lines when the second select line is activated, wherein each of the second gate lines is coupled to a respective row of second pixel elements in the array.

* * * * *